(12) United States Patent
Aota et al.

(10) Patent No.: US 8,357,068 B2
(45) Date of Patent: Jan. 22, 2013

(54) AUTOMATIC TRANSMISSION

(75) Inventors: Kazuaki Aota, Sagamihara (JP); Yukiyoshi Inuta, Sagamihara (JP); Akihiro Yamamoto, Isehara (JP); Naoki Kobayashi, Machida (JP); Takayuki Okuda, Atsugi (JP); Peter Tenberge, Chemnitz (DE); Joerg Mueller, Chemnitz (DE); Rico Resch, Wilsdruff (DE)

(73) Assignee: JATCO Ltd, Fuji-shi (JP)

( * ) Notice: Subject to any disclaimer, the term of this patent is extended or adjusted under 35 U.S.C. 154(b) by 262 days.

(21) Appl. No.: 12/731,892

(22) Filed: Mar. 25, 2010

(65) Prior Publication Data

US 2010/0273600 A1   Oct. 28, 2010

(30) Foreign Application Priority Data

Mar. 26, 2009   (JP) ................... 2009-075585

(51) Int. Cl.
*F16H 3/62* (2006.01)
(52) U.S. Cl. ...................................... 475/276
(58) Field of Classification Search ............ 475/269, 475/275, 276, 296, 280, 281, 330
See application file for complete search history.

(56) References Cited

U.S. PATENT DOCUMENTS

| | | | |
|---|---|---|---|
| 5,133,697 A | 7/1992 | Hattori | |
| 6,746,358 B2 | 6/2004 | Bucknor et al. | |
| 6,932,735 B2 | 8/2005 | Kao et al. | |
| 7,086,986 B2 | 8/2006 | Raghavan et al. | |
| 7,094,173 B2 | 8/2006 | Raghavan et al. | |
| 7,611,438 B2 | 11/2009 | Diosi et al. | |
| 7,686,732 B2 | 3/2010 | Raghavan et al. | |
| 7,731,622 B2 | 6/2010 | Wittkopp et al. | |
| 8,047,953 B2 * | 11/2011 | Wittkopp et al. | 475/284 |
| 2003/0232687 A1 | 12/2003 | Buchnor et al. | |

(Continued)

FOREIGN PATENT DOCUMENTS

DE   10 2004 041 446 A1   3/2006
EP       1 398 528 A2     3/2004

(Continued)

OTHER PUBLICATIONS

K. Aota, U.S. PTO Notice of Allowance and Allowability, U.S. Appl. No. 12/731,899, dated Sep. 22, 2011, 17 pages.

(Continued)

*Primary Examiner* — David D Le
*Assistant Examiner* — Stacey Fluhart
(74) *Attorney, Agent, or Firm* — Foley & Lardner LLP

(57) ABSTRACT

An automatic transmission includes first to third single-pinion planetary gearsets. The second ring gear and third sun gear are coupled to the first carrier and first ring gear respectively to constitute first and second rotor units. Input and output shafts are coupled to the second sun gear and third ring gear respectively. A first clutch selectively holds the first sun gear to the third carrier. A first brake selectively holds the first sun gear stationary. A second clutch selectively holds the second sun gear to the third carrier. A third clutch selectively holds the second carrier to the second rotor unit. A fourth clutch selectively holds the second carrier to the third carrier. A second brake selectively holds the first rotor unit stationary. At least eight gear ratios and one reverse gear ratio are obtained by simultaneous application of three of the clutches and brakes.

8 Claims, 13 Drawing Sheets

U.S. PATENT DOCUMENTS

| | | |
|---|---|---|
| 2004/0229725 A1 | 11/2004 | Hiraiwa |
| 2005/0090362 A1 | 4/2005 | Abe et al. |
| 2006/0148610 A1 | 7/2006 | Usoro et al. |
| 2007/0213169 A1* | 9/2007 | Gumpoltsberger ........... 475/275 |
| 2007/0259753 A1 | 11/2007 | Diosi et al. |
| 2008/0242479 A1 | 10/2008 | Hart et al. |
| 2008/0242484 A1 | 10/2008 | Hart et al. |
| 2008/0293535 A1 | 11/2008 | Phillips et al. |
| 2008/0300088 A1 | 12/2008 | Hart et al. |
| 2009/0023535 A1* | 1/2009 | Wittkopp et al. ............. 475/275 |
| 2009/0023538 A1 | 1/2009 | Carey et al. |
| 2009/0036254 A1 | 2/2009 | Wittkopp et al. |
| 2009/0048061 A1 | 2/2009 | Hart et al. |
| 2009/0215579 A1* | 8/2009 | Phillips ........................ 475/276 |
| 2010/0184553 A1 | 7/2010 | Wittkopp et al. |

FOREIGN PATENT DOCUMENTS

| | | |
|---|---|---|
| EP | 1 398 533 A2 | 3/2004 |
| JP | 2001-182785 A | 7/2001 |

OTHER PUBLICATIONS

A. Yamamoto, U.S. PTO Office Action, U.S. Appl. No. 12/847,380, dated Nov. 7, 2011, 12 pages.

U.S. Appl. No. 12/731,899, filed Mar. 25, 2010, Aota et al.

U.S. Appl. No. 12/847,380, filed Jul. 30, 2010, Yamamoto et al.

U.S. Appl. No. 12/847,421, filed Jul. 30, 2010, Yamamoto et al.

U.S. Appl. No. 12/947,378, filed Nov. 16, 2010, Aota et al.

A. Yamamoto, U.S. PTO Office Action, U.S. Appl. No. 12/847,421, dated Jul. 23, 2012, 19 pages.

K. Aota, U.S. PTO Office Action, U.S. Appl. No. 12/947,378, dated Aug. 13, 2012, 17 pages.

A. Yamamoto, U.S. PTO Notice of Allowance, U.S. Appl. No. 12/847,421, dated Oct. 26, 2012, 9 pages.

* cited by examiner

FIG.2

|  |  |  |  |  |  | $\rho 1=0.300$ $\rho 2=0.333$ $\rho 3=0.524$ |  RC=7.408 |
|---|---|---|---|---|---|---|---|
| GEAR | C1 | B1 | C2 | C3 | C4 | B2 | GEAR RATIO | RATIO BETWEEN GEAR RATIOS |
| FIRST | O | O |  |  | O |  | 4.408 | 1.678 |
| SECOND |  | O |  |  | O | O | 2.627 | 1.551 |
| THIRD |  | O |  | O | O |  | 1.693 | 1.427 |
| FOURTH |  | O | O |  | O |  | 1.187 | 1.187 |
| FIFTH |  |  | O | O | O |  | 1.000 | 1.214 |
| SIXTH |  | O | O | O |  |  | 0.823 | 1.147 |
| SEVENTH |  |  | O | O |  | O | 0.718 | 1.207 |
| EIGHTH | O |  | O |  |  | O | 0.595 |  |
| REVERSE | O | O |  | O |  |  | -3.231 |  |

FIG.3

THE NUMBER OF GEAR MESHES IN TORQUE FLOW

|  | 1ST | 2ND | 3RD | 4TH | 5TH | 6TH | 7TH | 8TH | AVERAGE |
|---|---|---|---|---|---|---|---|---|---|
| FIRST PLANETARY GEARSET | 2 | 0 | 2 | 2 | 0 | 2 | 0 | 2 | — |
| SECOND PLANETARY GEARSET | 2 | 2 | 2 | 0 | 0 | 2 | 2 | 0 | — |
| THIRD PLANETARY GEARSET | 2 | 2 | 0 | 2 | 0 | 2 | 2 | 2 | — |
| TOTAL | 6 | 4 | 4 | 4 | 0 | 6 | 4 | 4 | 4.0 |

FIRST GEAR

SECOND GEAR

THIRD GEAR

FOURTH GEAR

FIFTH GEAR

SIXTH GEAR

SEVENTH GEAR

EIGHTH GEAR

REVERSE GEAR

FIG.14

| GEAR | CX1 | CX2 | CX3 | CX4 | BX1 | BX2 | GEAR RATIO |
|---|---|---|---|---|---|---|---|
| FIRST | ○ | | | | | ○ | 4.267 |
| SECOND | ○ | | | | ○ | | 2.489 |
| THIRD | ○ | ○ | | | | | 1.600 |
| FOURTH | ○ | | | ○ | | | 1.318 |
| FIFTH | ○ | | ○ | | | | 1.164 |
| SIXTH | | | ○ | ○ | | | 1.000 |
| SEVENTH | | ○ | ○ | | | | 0.842 |
| EIGHTH | | | ○ | | ○ | | 0.667 |
| FIRST REVERSE | | ○ | | | | ○ | 3.200 |
| SECOND REVERSE | | | | ○ | | ○ | 2.000 |

FIG.15

THE NUMBER OF GEAR MESHES IN TORQUE FLOW

| | 1ST | 2ND | 3RD | 4TH | 5TH | 6TH | 7TH | 8TH | AVERAGE |
|---|---|---|---|---|---|---|---|---|---|
| FIRST PLANETARY GEARSET (DOUBLE PINION TYPE) | 3 | 3 | 3 | 3 | 3 | 0 | 3 | 0 | — |
| SECOND PLANETARY GEARSET (SINGLE PINION TYPE) | 0 | 2 | 0 | 2 | 0 | 0 | 2 | 2 | — |
| THIRD PLANETARY GEARSET (DOUBLE PINION TYPE) | 3 | 3 | 0 | 3 | 3 | 0 | 0 | 0 | — |
| TOTAL | 6 | 8 | 3 | 8 | 6 | 0 | 5 | 2 | 4.8 |

FIG.16

|  |  |  |  |  |  |  | ρ1=0.300 ρ2=0.333 ρ3=0.524 |
|---|---|---|---|---|---|---|---|
| GEAR | C1 | B1 | C2 | C3 | C4 | B2 | GEAR RATIO | RATIO BETWEEN GEAR RATIOS |
| FIRST | ○ | ○ |  |  | ○ |  | 4.408 | 1.678 |
| SECOND |  | ○ |  |  | ○ | ○ | 2.627 | 1.551 |
| THIRD |  | ○ |  | ○ | ○ |  | 1.693 | 1.427 |
| FOURTH |  | ○ | ○ |  | ○ |  | 1.187 | 1.187 |
| FIFTH |  |  | ○ | ○ | ○ |  | 1.000 | 1.214 |
| SIXTH |  | ○ | ○ | ○ |  |  | 0.823 | 1.147 |
| SEVENTH |  |  | ○ | ○ |  | ○ | 0.718 | 1.094 |
| EIGHTH |  | ○ | ○ |  |  | ○ | 0.656 |  |
| REVERSE | ○ | ○ |  | ○ |  |  | -3.231 |  |

FIG.17

THE NUMBER OF GEAR MESHES IN TORQUE FLOW

|  | 1ST | 2ND | 3RD | 4TH | 5TH | 6TH | 7TH | 8TH | AVERAGE |
|---|---|---|---|---|---|---|---|---|---|
| FIRST PLANETARY GEARSET | 2 | 0 | 2 | 2 | 0 | 2 | 0 | 0 | — |
| SECOND PLANETARY GEARSET | 2 | 2 | 2 | 0 | 0 | 2 | 2 | 0 | — |
| THIRD PLANETARY GEARSET | 2 | 2 | 0 | 2 | 0 | 2 | 2 | 2 | — |
| TOTAL | 6 | 4 | 4 | 4 | 0 | 6 | 4 | 2 | 3.75 |

EIGHTH GEAR

FIG.19

| | | | | | | | ρ1=0.300<br>ρ2=0.333<br>ρ3=0.524 |
|---|---|---|---|---|---|---|---|
| GEAR | C1 | B1 | C2 | C3 | C4 | B2 | GEAR RATIO | RATIO BETWEEN GEAR RATIOS |
| FIRST | | ○ | | | ○ | ○ | 2.627 | 1.551 |
| SECOND | | ○ | | ○ | ○ | | 1.693 | 1.427 |
| THIRD | | ○ | ○ | | ○ | | 1.187 | 1.187 |
| FOURTH | | | ○ | ○ | ○ | | 1.000 | 1.214 |
| FIFTH | | ○ | ○ | ○ | | | 0.823 | 1.147 |
| SIXTH | | | ○ | ○ | | ○ | 0.718 | 1.094 |
| SEVENTH | | ○ | ○ | | | ○ | 0.656 | 1.103 |
| EIGHTH | ○ | | ○ | | | ○ | 0.595 | |
| REVERSE | ○ | ○ | | ○ | | | -3.231 | |

FIG.20

THE NUMBER OF GEAR MESHES IN TORQUE FLOW

| | 1ST | 2ND | 3RD | 4TH | 5TH | 6TH | 7TH | 8TH | AVERAGE |
|---|---|---|---|---|---|---|---|---|---|
| FIRST PLANETARY GEARSET | 0 | 2 | 2 | 0 | 2 | 0 | 0 | 2 | — |
| SECOND PLANETARY GEARSET | 2 | 2 | 0 | 0 | 2 | 2 | 0 | 0 | — |
| THIRD PLANETARY GEARSET | 2 | 0 | 2 | 0 | 2 | 2 | 2 | 2 | — |
| TOTAL | 4 | 4 | 4 | 0 | 6 | 4 | 2 | 4 | 3.50 |

FIG.21

$\rho1=0.300$
$\rho2=0.333$     RC=7.408
$\rho3=0.524$

| GEAR | C1 | B1 | C2 | C3 | C4 | B2 | GEAR RATIO | RATIO BETWEEN GEAR RATIOS |
|---|---|---|---|---|---|---|---|---|
| FIRST | ○ | ○ | | | ○ | | 4.408 | 1.678 |
| SECOND | | ○ | | | ○ | ○ | 2.627 | 1.551 |
| THIRD | | ○ | | ○ | ○ | | 1.693 | 1.427 |
| FOURTH | | ○ | ○ | | ○ | | 1.187 | 1.187 |
| FIFTH | | | ○ | ○ | ○ | | 1.000 | 1.214 |
| SIXTH | | ○ | ○ | ○ | | | 0.823 | 1.215 |
| SEVENTH | | ○ | ○ | | | ○ | 0.656 | 1.103 |
| EIGHTH | ○ | | ○ | | | ○ | 0.595 | |
| REVERSE | ○ | ○ | | ○ | | | -3.231 | |

FIG.22

THE NUMBER OF GEAR MESHES IN TORQUE FLOW

| | 1ST | 2ND | 3RD | 4TH | 5TH | 6TH | 7TH | 8TH | AVERAGE |
|---|---|---|---|---|---|---|---|---|---|
| FIRST PLANETARY GEARSET | 2 | 0 | 2 | 2 | 0 | 2 | 0 | 2 | — |
| SECOND PLANETARY GEARSET | 2 | 2 | 2 | 0 | 0 | 2 | 2 | 0 | — |
| THIRD PLANETARY GEARSET | 2 | 2 | 0 | 2 | 0 | 2 | 2 | 2 | — |
| TOTAL | 6 | 4 | 4 | 4 | 0 | 6 | 4 | 4 | 3.75 |

FIG.23

| | | | | | | ρ1=0.300 ρ2=0.333 ρ3=0.524 | RC=7.408 |

| GEAR | C1 | B1 | C2 | C3 | C4 | B2 | GEAR RATIO | RATIO BETWEEN GEAR RATIOS |
|---|---|---|---|---|---|---|---|---|
| FIRST | ○ | ○ | | | ○ | | 4.408 | 1.678 |
| SECOND | | ○ | | | ○ | ○ | 2.627 | 1.551 |
| THIRD | | ○ | | ○ | ○ | | 1.693 | 1.427 |
| FOURTH | | ○ | ○ | | ○ | | 1.187 | 1.187 |
| FIFTH | | | ○ | ○ | ○ | | 1.000 | 1.214 |
| SIXTH | | ○ | ○ | ○ | | | 0.823 | 1.147 |
| SEVENTH | | | ○ | ○ | | ○ | 0.718 | 1.094 |
| EIGHTH | | ○ | ○ | | | ○ | 0.656 | 1.103 |
| NINTH | ○ | | ○ | | | ○ | 0.595 | |
| REVERSE | ○ | ○ | | ○ | | | -3.231 | |

FIG.24

THE NUMBER OF GEAR MESHES IN TORQUE FLOW

| | 1ST | 2ND | 3RD | 4TH | 5TH | 6TH | 7TH | 8TH | 9TH | AVERAGE |
|---|---|---|---|---|---|---|---|---|---|---|
| FIRST PLANETARY GEARSET | 2 | 0 | 2 | 2 | 0 | 2 | 0 | 0 | 2 | — |
| SECOND PLANETARY GEARSET | 2 | 2 | 2 | 0 | 0 | 2 | 2 | 0 | 0 | — |
| THIRD PLANETARY GEARSET | 2 | 2 | 0 | 2 | 0 | 2 | 2 | 2 | 2 | — |
| TOTAL | 6 | 4 | 4 | 4 | 0 | 6 | 4 | 2 | 4 | 3.8 |

AUTOMATIC TRANSMISSION

BACKGROUND OF THE INVENTION

The present invention relates to multiple-speed automatic transmissions for motor vehicles.

There is demand for multiplication of gear ratios, and widening of overall gear ratio coverage in motor vehicles. Japanese Patent Application Publication No. 2001-182785 discloses an eight-speed automatic transmission which is composed of one double-pinion planetary gearset, one Ravigneaux planetary gearset, four clutches, and two brakes.

SUMMARY OF THE INVENTION

The automatic transmission according to Japanese Patent Application Publication No. 2001-182785 can be regarded as having two double-pinion planetary gearsets and one single-pinion planetary gearset, because the Ravigneaux planetary gearset can be regarded as having one double-pinion planetary gearset and one single-pinion planetary gearset. This structure can cause at least the following three adverse effects: (1) The number of gear meshes in torque flow is large, adversely affecting the gear efficiency and gear noise level; (2) The diameters of planet pinions are small, adversely affecting the durability and reliability of the planet pinions; and (3) The automatic transmission is composed of a large number of parts, adversely affecting the manufacturing cost.

In the automatic transmission according to Japanese Patent Application Publication No. 2001-182785, each gear ratio is obtained by simultaneous application of two of the six coupling members (four clutches and two brakes). Accordingly, in this automatic transmission, four of the coupling members are released constantly, in each of which a pair of engaging elements are rotating relative to each other. Relative rotation between the engaging elements in each released coupling member can cause a friction loss, and thereby adversely affect the power transfer efficiency.

In view of the foregoing, it is desirable to provide an automatic transmission which is capable of providing at least eight gear ratios, with improvement in the gear efficiency, gear noise level, durability and reliability, and manufacturing cost, and also with improvement in the power transfer efficiency.

According to one aspect of the present invention, an automatic transmission comprises: a first planetary gearset including: a first sun gear; a first ring gear; and a first planet-pinion carrier arranged to carry a first planet pinion in mesh with the first sun gear and the first ring gear; a second planetary gearset including: a second sun gear; a second ring gear, wherein the second ring gear is constantly coupled to the first planet-pinion carrier so as to constitute a first rotor unit; and a second planet-pinion carrier arranged to carry a second planet pinion in mesh with the second sun gear and the second ring gear; a third planetary gearset including: a third sun gear, wherein the third sun gear is constantly coupled to the first ring gear so as to constitute a second rotor unit; a third ring gear; and a third planet-pinion carrier arranged to carry a third planet pinion in mesh with the third sun gear and the third ring gear; an input shaft constantly coupled to the second sun gear; an output shaft constantly coupled to the third ring gear; a first coupling member arranged to be selectively applied to couple the first sun gear to the third planet-pinion carrier; a second coupling member arranged to be selectively applied to hold the first sun gear stationary; a third coupling member arranged to be selectively applied to couple the second sun gear to the third planet-pinion carrier; a fourth coupling member arranged to be selectively applied to couple the second planet-pinion carrier to the second rotor unit; a fifth coupling member arranged to be selectively applied to couple the second planet-pinion carrier to the third planet-pinion carrier; and a sixth coupling member arranged to be selectively applied to hold the first rotor unit stationary, wherein at least first to eighth gear ratios and one reverse gear ratio are obtained between the input shaft and the output shaft by simultaneous application of three of the first to sixth coupling members.

BRIEF DESCRIPTION OF THE DRAWINGS

FIG. 2 is a table showing which three of six coupling members are selectively applied to obtain respective ones of first to eighth gear ratios and one reverse gear ratio in the automatic transmission according to the first embodiment.

FIG. 3 is a table showing the number of gear meshes in torque flow in each forward gear ratio in the automatic transmission according to the first embodiment.

FIG. 14 is a table showing which two of six coupling members are selectively applied to obtain respective ones of eight gear ratios and two reverse gear ratios in the automatic transmission shown in FIG. 13.

FIG. 15 is a table showing the number of gear meshes in torque flow in each forward gear ratio in the automatic transmission shown in FIG. 13.

FIG. 16 is a table showing which three of six coupling members are selectively applied to obtain respective ones of first to eighth gear ratios and one reverse gear ratio in the automatic transmission according to the second embodiment.

FIG. 17 is a table showing the number of gear meshes in torque flow in each forward gear ratio in the automatic transmission according to the second embodiment.

FIG. 19 is a table showing which three of six coupling members are selectively applied to obtain respective ones of first to eighth gear ratios and one reverse gear ratio in the automatic transmission according to the third embodiment.

FIG. 20 is a table showing the number of gear meshes in torque flow in each forward gear ratio in the automatic transmission according to the third embodiment.

FIG. 21 is a table showing which three of six coupling members are selectively applied to obtain respective ones of first to eighth gear ratios and one reverse gear ratio in the automatic transmission according to the fourth embodiment.

FIG. 22 is a table showing the number of gear meshes in torque flow in each forward gear ratio in the automatic transmission according to the fourth embodiment.

FIG. 23 is a table showing which three of six coupling members are selectively applied to obtain respective ones of first to ninth gear ratios and one reverse gear ratio in the automatic transmission according to the fifth embodiment.

FIG. 24 is a table showing the number of gear meshes in torque flow in each forward gear ratio in the automatic transmission according to the fifth embodiment.

DETAILED DESCRIPTION OF THE INVENTION

Figure 1:
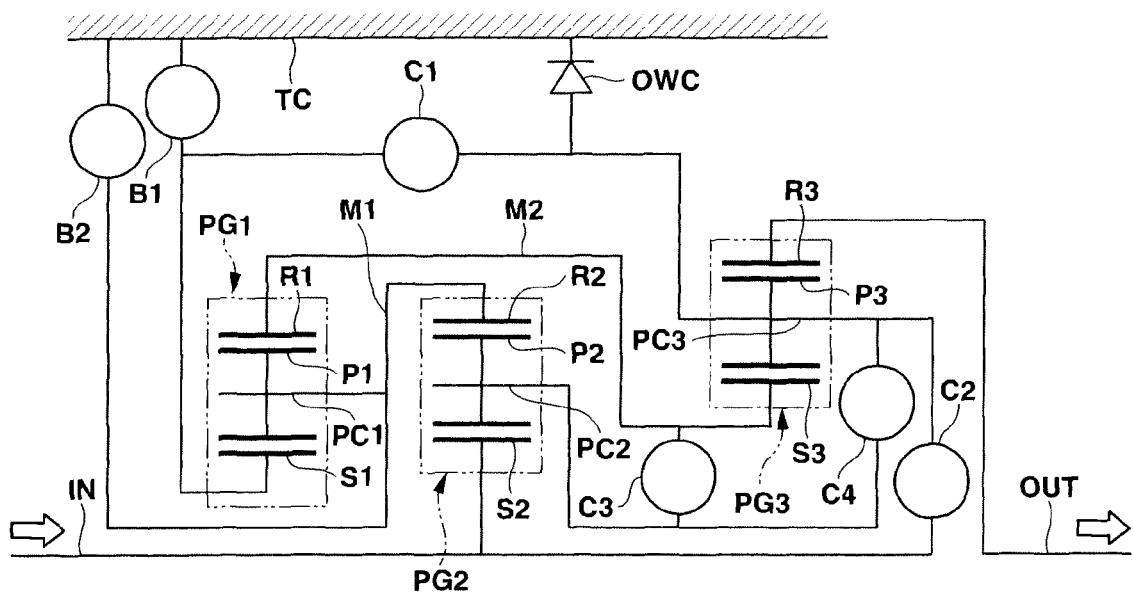
FIG. 1 is a skeleton diagram showing a common structure of automatic transmissions according to first to fifth embodiments of the present invention.

FIG. 1 shows a common structure of automatic transmissions according to first to fifth embodiments of the present invention. As shown in FIG. 1, the structure includes a first planetary gearset PG1, a second planetary gearset PG2, a third planetary gearset PG3, an input shaft "IN", an output shaft "OUT", a first rotor M1, a second rotor M2, a first clutch C1 as a first coupling member or friction member, a first brake B1 as a second coupling member or friction member, a second clutch C2 as a third coupling member or friction member, a third clutch C3 as a fourth coupling member or friction member, a fourth clutch C4 as a fifth coupling member or friction member, a second brake B2 as a sixth coupling member or friction member, a one-way clutch "OWC", and a transmission case "TC".

First planetary gearset PG1 is of a single pinion type, including a first sun gear S1, a first ring gear R1, and a first planet-pinion carrier PC1 that is arranged to carry a first planet pinion set P1 in simultaneous mesh with first sun gear S1 and first ring gear R1. Second planetary gearset PG2 is of a single pinion type, including a second sun gear S2, a second ring gear R2, and a second planet-pinion carrier PC2 that is arranged to carry a second planet pinion set P2 in simultaneous mesh with second sun gear S2 and second ring gear R2. Third planetary gearset PG3 is of a single pinion type, including a third sun gear S3, a third ring gear R3, and a third planet-pinion carrier PC3 that is arranged to carry a third planet pinion set P3 in simultaneous mesh with third sun gear S3 and third ring gear R3.

Input shaft IN is adapted to be connected to a driving source such as an internal combustion engine, so that a driving torque is inputted through a torque converter, etc. to input shaft IN. Input shaft IN is fixed or constantly coupled to second sun gear S2. On the other hand, output shaft OUT is adapted to be connected to driving wheels, so that a shifted driving torque is outputted through a propeller shaft, a final gear, etc. to the driving wheels. Output shaft OUT is fixed or constantly coupled to third ring gear R3.

First rotor M1 fixes or constantly couples first planet-pinion carrier PC1 to second ring gear R2 with no coupling member therebetween, where first rotor M1, first planet-pinion carrier PC1, and second ring gear R2 constitute a first rotor unit. On the other hand, second rotor M2 fixes or constantly couples first ring gear R1 to third sun gear S3 with no coupling member therebetween, where second rotor M2, first ring gear R1, and third sun gear S3 constitute a second rotor unit.

First clutch C1 is arranged to be selectively applied to couple first sun gear S1 to third planet-pinion carrier PC3, namely, hold first sun gear S1 with respect to third planet-pinion carrier PC3. First brake B1 is arranged to be selectively applied to couple first sun gear S1 to transmission case TC, namely, hold first sun gear S1 stationary. Second clutch C2 is arranged to be selectively applied to couple second sun gear S2 to third planet-pinion carrier PC3, namely, hold second sun gear S2 with respect to third planet-pinion carrier PC3. Third clutch C3 is arranged to be selectively applied to couple second planet-pinion carrier PC2 to second rotor M2, namely, hold second planet-pinion carrier PC2 with respect to second rotor M2. Fourth clutch C4 is arranged to be selectively applied to couple second planet-pinion carrier PC2 to third planet-pinion carrier PC3, namely, hold second planet-pinion carrier PC2 with respect to third planet-pinion carrier PC3. Second brake B2 is arranged to be selectively applied to couple first rotor M1 to transmission case TC, namely, hold first rotor M1 stationary. One-way clutch OWC is arranged to allow third planet-pinion carrier PC3 to rotate in a normal rotational direction, and prevent third planet-pinion carrier PC3 from rotating in a reverse rotational direction.

First planetary gearset PG1, second planetary gearset PG2, and third planetary gearset PG3 are arranged in this order from an input side to an output side in an axial direction of the automatic transmission, wherein input shaft IN is arranged at the input side, and output shaft OUT is arranged at the output side. First brake B1 and second brake B2 are arranged closer to the input side in the axial direction than first planetary gearset PG1.

First Embodiment

FIG. 2 shows which three of the six coupling members are selectively applied to obtain respective ones of first to eighth gear ratios and one reverse gear ratio in the automatic transmission according to the first embodiment. FIG. 3 shows the number of gear meshes in torque flow in each forward gear ratio in the automatic transmission according to the first embodiment. The number of gear meshes in torque flow is defined as the number of places in torque flow where torque is transmitted between gears turning in mesh with each other.

The first gear ratio is obtained by simultaneous application of first clutch C1, first brake B1 and fourth clutch C4, as shown in FIG. 2. As shown in FIG. 3, in first gear, the number of gear meshes in torque flow is six, because all of first planetary gearset PG1, second planetary gearset PG2, and third planetary gearset PG3 work for power transfer, and each of them has two places in torque flow where torque is transmitted between gears turning in mesh with each other.

The second gear ratio is obtained by simultaneous application of first brake B1, fourth clutch C4 and second brake B2, as shown in FIG. 2. As shown in FIG. 3, in second gear, the number of gear meshes in torque flow is four, because second planetary gearset PG2 and third planetary gearset PG3 work for power transfer, and each of them has two places in torque flow where torque is transmitted between gears turning in mesh with each other.

The third gear ratio is obtained by simultaneous application of first brake B1, third clutch C3 and fourth clutch C4, as shown in FIG. 2. As shown in FIG. 3, in third gear, the number of gear meshes in torque flow is four, because first planetary gearset PG1 and second planetary gearset PG2 work for power transfer, and each of them has two places in torque flow where torque is transmitted between gears turning in mesh with each other.

The fourth gear ratio is obtained by simultaneous application of first brake B1, second clutch C2 and fourth clutch C4, as shown in FIG. 2. As shown in FIG. 3, in fourth gear, the number of gear meshes in torque flow is four, because first planetary gearset PG1 and third planetary gearset PG3 work for power transfer, and each of them has two places in torque flow where torque is transmitted between gears turning in mesh with each other.

The fifth gear ratio is obtained by simultaneous application of second clutch C2, third clutch C3 and fourth clutch C4, as shown in FIG. 2. As shown in FIG. 3, in fifth gear, the number of gear meshes in torque flow is zero, because none of first planetary gearset PG1, second planetary gearset PG2, and third planetary gearset PG3 works for power transfer.

The sixth gear ratio is obtained by simultaneous application of first brake B1, second clutch C2 and third clutch C3, as shown in FIG. 2. As shown in FIG. 3, in sixth gear, the number of gear meshes in torque flow is six, because all of first planetary gearset PG1, second planetary gearset PG2, and third planetary gearset PG3 work for power transfer, and each of them has two places in torque flow where torque is transmitted between gears turning in mesh with each other.

The seventh gear ratio is obtained by simultaneous application of second clutch C2, third clutch C3 and second brake B2, as shown in FIG. 2. As shown in FIG. 3, in seventh gear, the number of gear meshes in torque flow is four, because second planetary gearset PG2 and third planetary gearset PG3 work for power transfer, and each of them has two places in torque flow where torque is transmitted between gears turning in mesh with each other.

The eighth gear ratio is obtained by simultaneous application of first clutch C1, second clutch C2 and second brake B2, as shown in FIG. 2. As shown in FIG. 3, in eighth gear, the number of gear meshes in torque flow is four, because first planetary gearset PG1 and third planetary gearset PG3 work for power transfer, and each of them has two places in torque flow where torque is transmitted between gears turning in mesh with each other.

The reverse gear ratio is obtained by simultaneous application of first clutch C1, first brake B1 and third clutch C3, as shown in FIG. 2.

FIGS. 4 to 12 show how the eight forward gear ratios and one reverse gear ratio are obtained in the automatic transmission according to the first embodiment.

Figure 4:
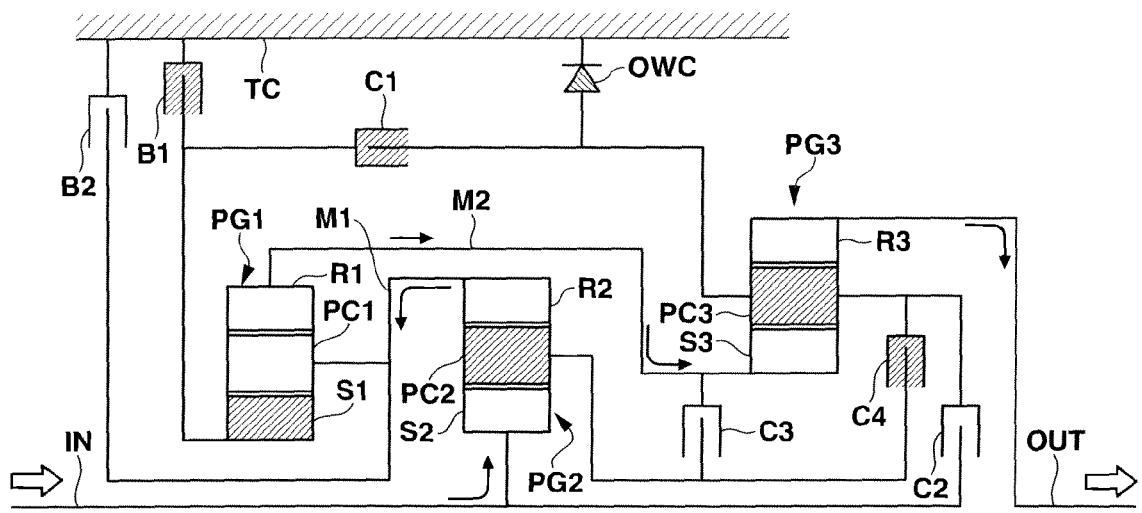
FIG. 4 is a diagram showing how the first gear ratio is obtained in the automatic transmission according to the first embodiment.

<First Gear> In first gear, first clutch C1, first brake B1 and fourth clutch C4 are simultaneously applied, as shown by hatching pattern in FIG. 4. Accordingly, first sun gear S1, second planet-pinion carrier PC2, and third planet-pinion carrier PC3 are held stationary with respect to transmission case TC. When second sun gear S2 is driven in the normal direction with input shaft IN, the rotation of second sun gear S2 causes second ring gear R2 to rotate in the reverse direction at a reduced speed in second planetary gearset PG2 where second planet-pinion carrier PC2 is held stationary. The rotation of second ring gear R2 drives first planet-pinion carrier PC1 through first rotor M1, causing the first ring gear R1 to rotate in the reverse direction at an increased speed in first planetary gearset PG1 where first sun gear S1 is held stationary. The rotation of first ring gear R1 drives third sun gear S3 through second rotor M2, causing the third ring gear R3 to rotate in the normal direction at a reduced speed in third planetary gearset PG3 where third planet-pinion carrier PC3 is held stationary. Finally, the rotation of third ring gear R3 drives output shaft OUT in the normal direction with a speed reduction of the first gear ratio with respect to the rotational speed of input shaft IN.

When a drive range (D range) is selected, first clutch C1 is released in first gear. Under this condition, one-way clutch OWC allows a torque to be transmitted in one rotational direction, and prevents a torque to be transmitted in the opposite rotational direction, which serves for smooth shifting. To transmit engine braking torque to the driving wheels, first clutch C1 is applied hydraulically, for example, when a fixed gear range is selected.

Figure 5:
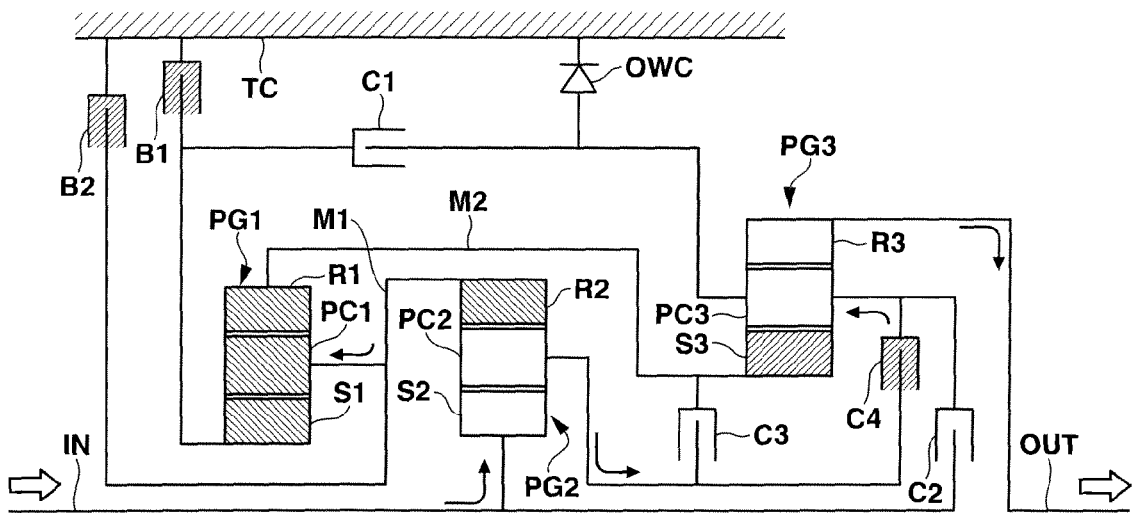
FIG. 5 is a diagram showing how the second gear ratio is obtained in the automatic transmission according to the first embodiment.

<Second Gear> In second gear, first brake B1, fourth clutch C4 and second brake B2 are simultaneously applied, as shown by hatching pattern in FIG. 5. With first brake B1 and second brake B2 simultaneously applied, first sun gear S1, first planet-pinion carrier PC1 and first ring gear R1 are locked together, and held stationary with respect to transmission case TC. Accordingly, second ring gear R2, and third sun gear S3, which are constantly coupled to first planet-pinion carrier PC1 and first ring gear R1 respectively through first rotor M1 and second rotor M2 respectively, are held stationary with respect to transmission case TC. With fourth clutch C4 applied, second planet-pinion carrier PC2 is coupled to third planet-pinion carrier PC3. When second sun gear S2 is driven in the normal direction with input shaft IN, the rotation of second sun gear S2 causes second planet-pinion carrier PC2 to rotate in the normal direction at a reduced speed in second planetary gearset PG2 where second ring gear R2 is held stationary. The rotation of second planet-pinion carrier PC2 drives third planet-pinion carrier PC3 through fourth clutch C4, causing the third ring gear R3 to rotate in the normal direction at an increased speed in third planetary gearset PG3 where third sun gear S3 is held stationary. Finally, the rotation of third ring gear R3 drives output shaft OUT in the normal direction with a speed reduction of the second gear ratio with respect to the rotational speed of input shaft IN, where the rotation of output shaft OUT is faster than in first gear.

Figure 6:
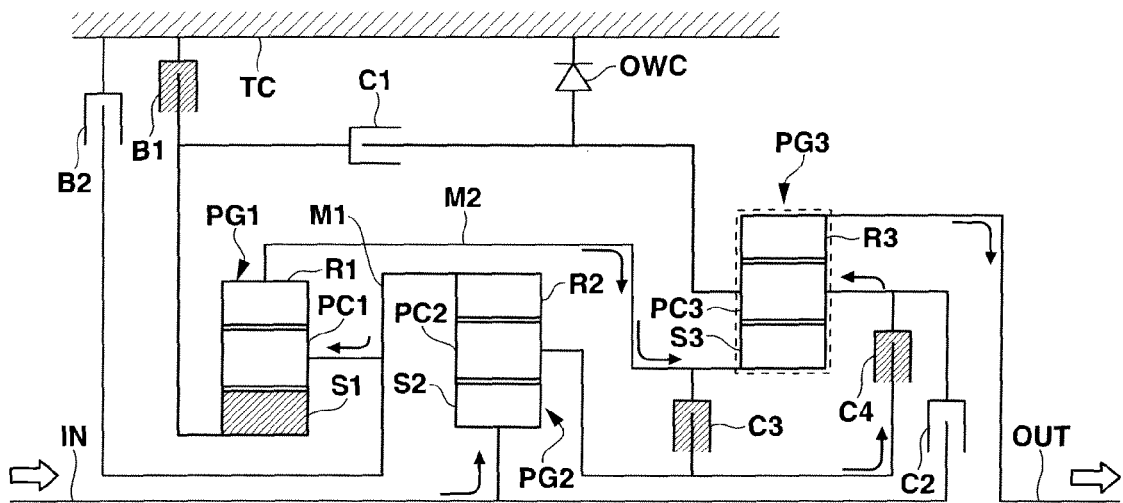
FIG. 6 is a diagram showing how the third gear ratio is obtained in the automatic transmission according to the first embodiment.

<Third Gear> In third gear, first brake B1, third clutch C3 and fourth clutch C4 are simultaneously applied, as shown by hatching pattern in FIG. 6. With first brake B1 applied, first sun gear S1 is held stationary with respect to transmission case TC. With third clutch C3 and fourth clutch C4 simultaneously applied, third sun gear S3, third planet-pinion carrier PC3, third ring gear R3, and second planet-pinion carrier PC2 are locked together, to rotate as a solid unit at the output speed. Also, first ring gear R1, which is constantly coupled to third sun gear S3 through second rotor M2, rotates solidly with third planetary gearset PG3 at the output speed. When second sun gear S2 is driven in the normal direction with input shaft IN and second planet-pinion carrier PC2 is driven at the output speed, second ring gear R2 is caused to rotate in the normal direction at a reduced speed (reduced from the input speed) in second planetary gearset PG2. The rotation of second ring gear R2 drives first planet-pinion carrier PCI through first rotor M1, causing the first ring gear R1 to rotate in the normal direction at an increased speed in first planetary gearset PG1 where first sun gear S1 is held stationary. The rotation of first ring gear R1 drives, through second rotor M2, third sun gear S3, third planet-pinion carrier PC3, and third ring gear R3 as a solid unit in third planetary gearset PG3. Finally, the rotation of third ring gear R3 drives output shaft OUT in the normal direction with a speed reduction of the third gear ratio with respect to the rotational speed of input shaft IN, where the rotation of output shaft OUT is faster than in second gear.

Figure 7:
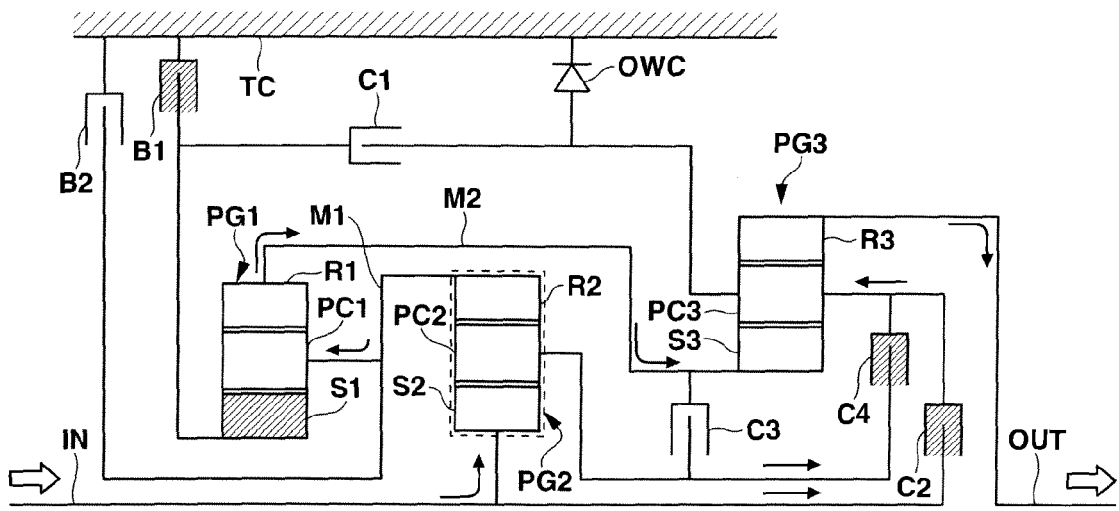
FIG. 7 is a diagram showing how the fourth gear ratio is obtained in the automatic transmission according to the first embodiment.

<Fourth Gear> In fourth gear, first brake B1, second clutch C2 and fourth clutch C4 are simultaneously applied, as shown by hatching pattern in FIG. 7. With first brake B1 applied, first sun gear S1 is held stationary with respect to transmission case TC. With second clutch C2 and fourth clutch C4 simultaneously applied, second sun gear S2, second planet-pinion carrier PC2, second ring gear R2 and third planet-pinion carrier PC3 are locked together, to rotate as a solid unit at the input speed. When second sun gear S2 is driven in the normal direction with input shaft IN, the rotation of second ring gear R2 drives first planet-pinion carrier PC1 in the normal direction at the input speed, causing the first ring gear R1 to rotate in the normal direction at an increased speed in first planetary gearset PG1 where first sun gear S1 is held stationary. The rotation of first ring gear R1 drives third sun gear S3 through second rotor M2. In this way, third planetary gearset PG3 provides a planetary function of two inputs and one output. Third ring gear R3 is caused to rotate in the normal direction at a speed which is determined by the rotational speed of third planet-pinion carrier PC3 (the input speed) and the rotational speed of third sun gear S3. Finally, the rotation of third ring gear R3 drives output shaft OUT in the normal direction with a speed reduction of the fourth gear ratio with respect to the rotational speed of input shaft IN, where the rotation of output shaft OUT is faster than in third gear.

Figure 8:
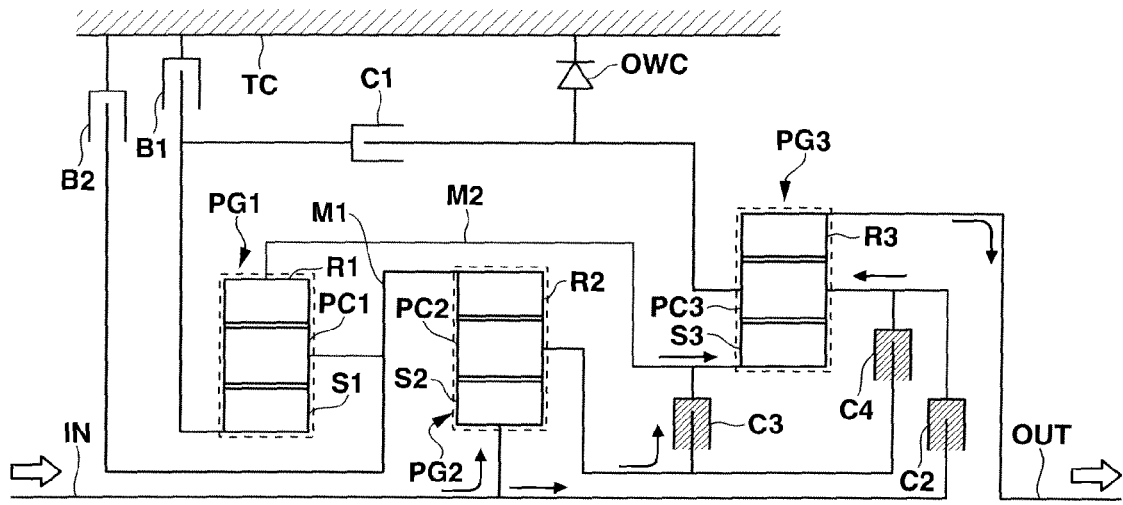
FIG. 8 is a diagram showing how the fifth gear ratio is obtained in the automatic transmission according to the first embodiment.

<Fifth Gear> In fifth gear, second dutch C2, third clutch C3 and fourth clutch C4 are simultaneously applied, as shown by hatching pattern in FIG. 8. Accordingly, all of the members of first planetary gearset PG1, second planetary gearset PG2, and third planetary gearset PG3 are locked together, to rotate as a solid unit at the input speed. The rotational speed of output shaft OUT is equal to that of input shaft IN, where the fifth gear ratio is equal to one (direct drive gear ratio).

Figure 9:
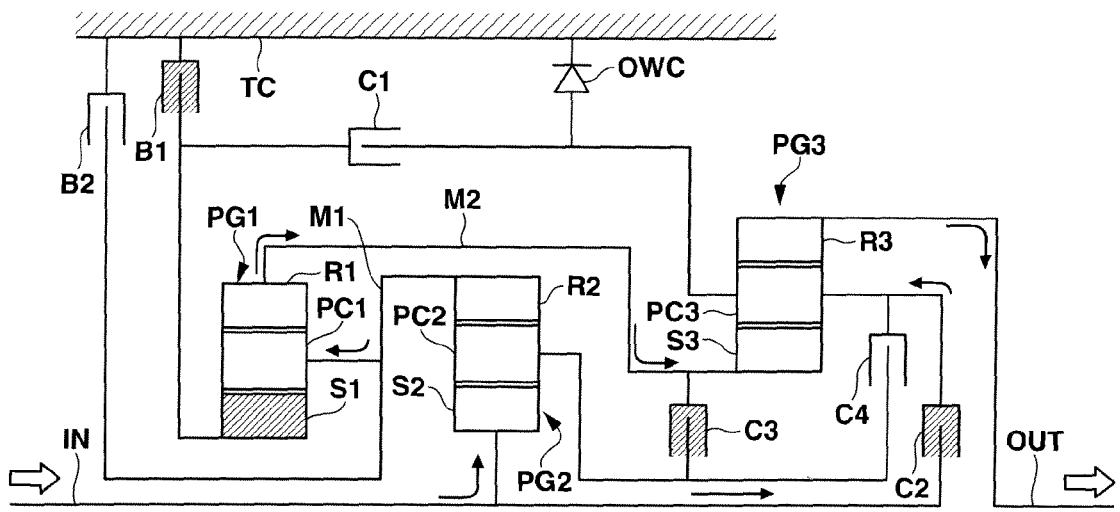
FIG. 9 is a diagram showing how the sixth gear ratio is obtained in the automatic transmission according to the first embodiment.

<Sixth Gear> In sixth gear, first brake B1, second clutch C2 and third clutch C3 are simultaneously applied, as shown by hatching pattern in FIG. 9. With first brake B1 applied, first sun gear S1 is held stationary with respect to transmission case TC. With second clutch C2 applied, third planet-pinion carrier PC3 is coupled to second sun gear S2, to rotate at the input speed. With third clutch C3 applied, first ring gear R1, second planet-pinion carrier PC2, and third sun gear S3 rotate as a solid unit. When second sun gear S2 is driven in the normal direction with input shaft IN, and second planet-pinion carrier PC2 are driven by third sun gear S3, second ring gear R2 is caused to rotate in the normal direction at a reduced speed (reduced from the input speed). The rotation of second ring gear R2 drives first planet-pinion carrier PC1 through first rotor M1, causing the first ring gear R1 to rotate in the normal direction at an increased speed in first planetary gearset PG1 where first sun gear S1 is held stationary. The rotation of first ring gear R1 drives third sun gear S3 through second rotor M2. In this way, third planetary gearset PG3 provides a planetary function of two inputs and one output. Third ring gear R3 is caused to rotate in the normal direction at a speed which is determined by the rotational speed of third planet-pinion carrier PC3 (the input speed) and the rotational speed of third sun gear S3. Finally, the rotation of third ring gear R3 drives output shaft OUT in the normal direction with a speed increase of the fifth gear ratio with respect to the rotational speed of input shaft IN.

Figure 10:
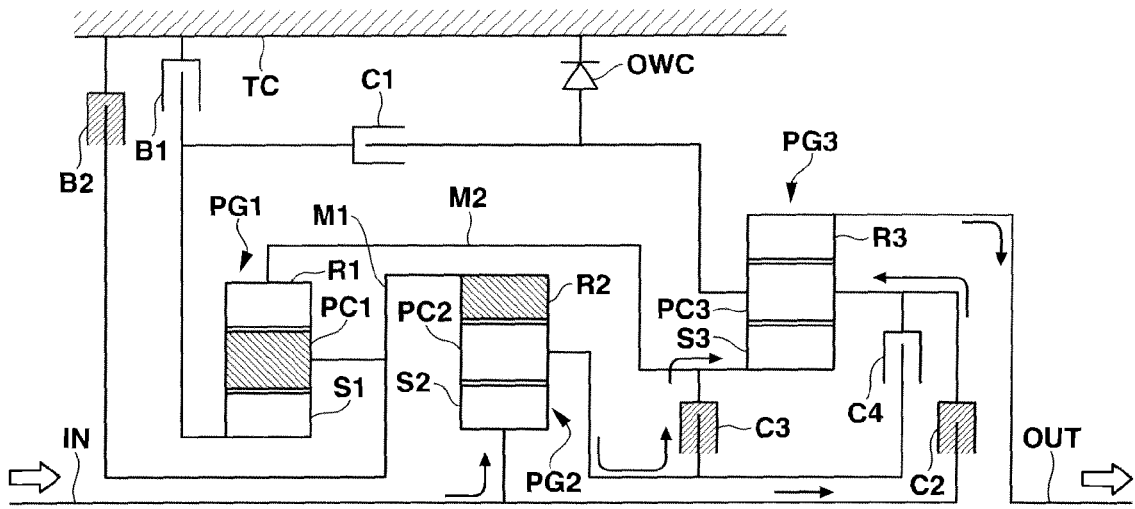
FIG. 10 is a diagram showing how the seventh gear ratio is obtained in the automatic transmission according to the first embodiment.

<Seventh Gear> In seventh gear, second clutch C2, third clutch C3 and second brake B2 are simultaneously applied, as shown by hatching pattern in FIG. 10. With second brake B2 applied, first planet-pinion carrier PC1 and second ring gear R2 are held stationary with respect to transmission case TC. With second clutch C2 applied, third planet-pinion carrier PC3 is coupled to second sun gear S2, to rotate at the input speed. With third clutch C3 applied, first ring gear R1, second planet-pinion carrier PC2, and third sun gear S3 rotate as a solid unit. When second sun gear S2 is driven in the normal direction with input shaft IN, the rotation of second sun gear S2 causes second planet-pinion carrier PC2 to rotate in the normal direction at a reduced speed in second planetary gearset PG2 where second ring gear R2 is held stationary. The rotation of second planet-pinion carrier PC2 drives third sun gear S3 through third clutch C3. In this way, third planetary gearset PG3 provides a planetary function of two inputs and one output. Third ring gear R3 is caused to rotate in the normal direction at a speed which is determined by the rotational speed of third planet-pinion carrier PC3 (the input speed) and the rotational speed of third sun gear S3. Finally, the rotation of third ring gear R3 drives output shaft OUT in the normal direction with a speed increase of the seventh gear ratio with respect to the rotational speed of input shaft IN, where the rotation of output shaft OUT is faster than in sixth gear.

Figure 11:
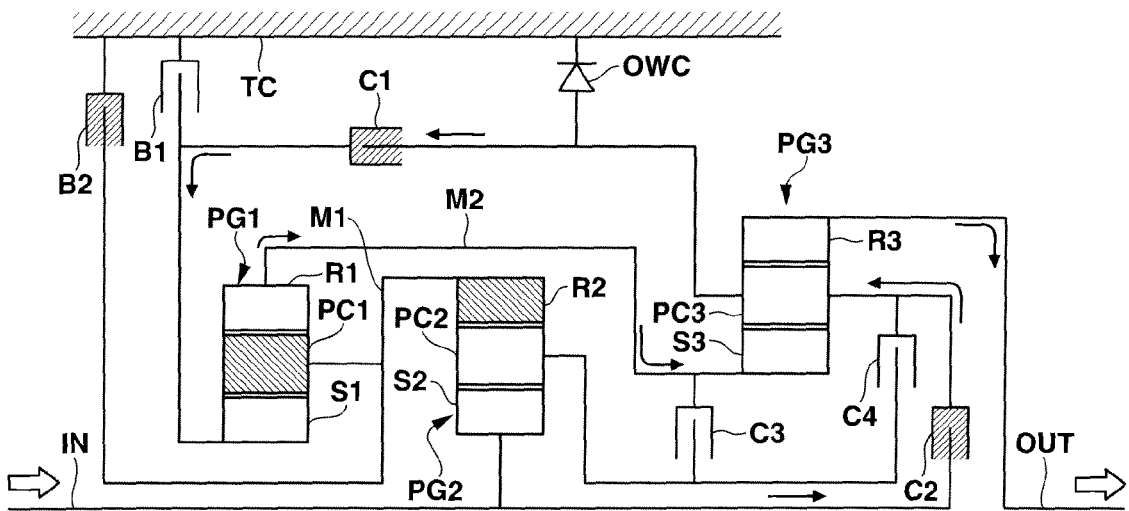
FIG. 11 is a diagram showing how the eighth gear ratio is obtained in the automatic transmission according to the first embodiment.

<Eighth Gear> In eighth gear, first clutch C1, second clutch C2 and second brake B2 are simultaneously applied, as shown by hatching pattern in FIG. 11. With second brake B2 applied, first planet-pinion carrier PC1 and second ring gear R2 are held stationary with respect to transmission case TC. With first clutch C1 and second clutch C2 applied, third planet-pinion carrier PC3 is coupled to second sun gear S2 and first sun gear S1, to rotate as a solid unit at the input speed. When first sun gear S1 is driven in the normal direction by input shaft IN through second clutch C2, third planet-pinion carrier PC3 and first clutch C1, the rotation of first sun gear S1 causes first ring gear R1 to rotate in the reverse direction at a reduced speed in first planetary gearset PG1 where first planet-pinion carrier PC1 is held stationary. The rotation of first ring gear R1 drives third sun gear S3 through second rotor M2. In this way, third planetary gearset PG3 provides a planetary function of two inputs and one output. Third ring gear R3 is caused to rotate in the normal direction at a speed which is determined by the rotational speed of third planet-pinion carrier PC3 (the input speed) and the rotational speed of third sun gear S3. Finally, the rotation of third ring gear R3 drives output shaft OUT in the normal direction with a speed increase of the eighth gear ratio with respect to the rotational speed of input shaft IN, where the rotation of output shaft OUT is faster than in seventh gear.

Figure 12:
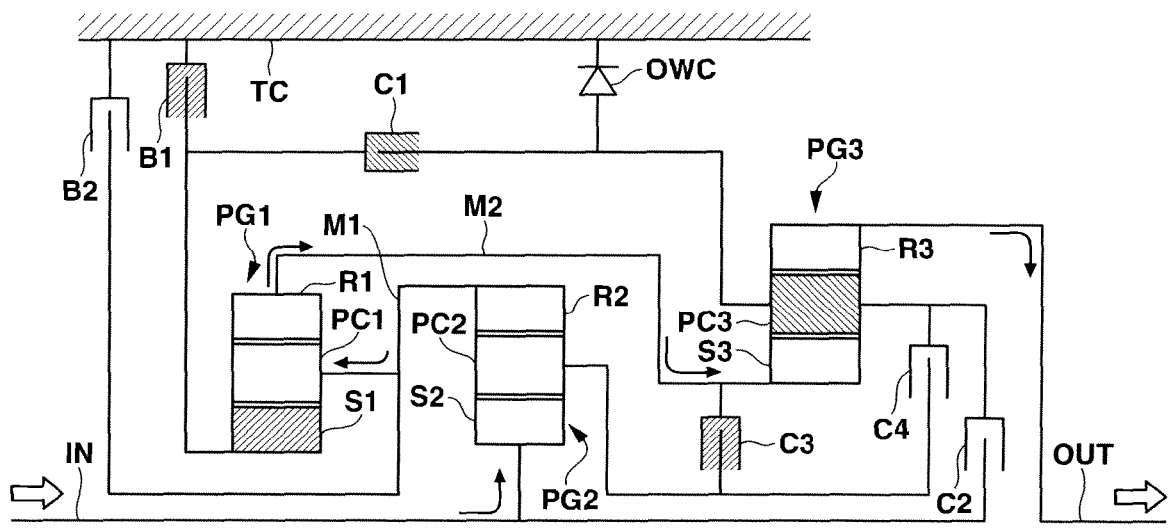
FIG. 12 is a diagram showing how the reverse gear ratio is obtained in the automatic transmission according to the first embodiment.

<Reverse Gear> In reverse gear, first clutch C1, first brake B1 and third clutch C3 are simultaneously applied, as shown by hatching pattern in FIG. 12. With first clutch C1 and first brake B1 applied, first sun gear S1 and third planet-pinion carrier PC3 are held stationary with respect to transmission case TC. With third clutch C3 applied, first ring gear R1, second planet-pinion carrier PC2, and third sun gear S3 rotate as a solid unit. When second sun gear S2 is driven in the normal direction with input shaft IN, and second planet-pinion carrier PC2 are driven by third sun gear S3, second ring gear R2 is caused to rotate in the normal direction at a reduced speed (reduced from the input speed). The rotation of second ring gear R2 drives first planet-pinion carrier PC1 through first rotor M1, causing the first ring gear R1 to rotate in the normal direction at an increased speed in first planetary gearset PG1 where first sun gear S1 is held stationary. The rotation of first ring gear R1 drives third sun gear S3 through second rotor M2, causing the third ring gear R3 to rotate in the reverse direction at a reduced speed in third ring gear R3 where third planet-pinion carrier PC3 is held stationary. Finally, the rotation of third ring gear R3 drives output shaft OUT in the reverse direction with a speed reduction of the reverse gear ratio with respect to the rotational speed of input shaft IN.

Advantageous Effects in Comparison with Reference Example

Figure 13:
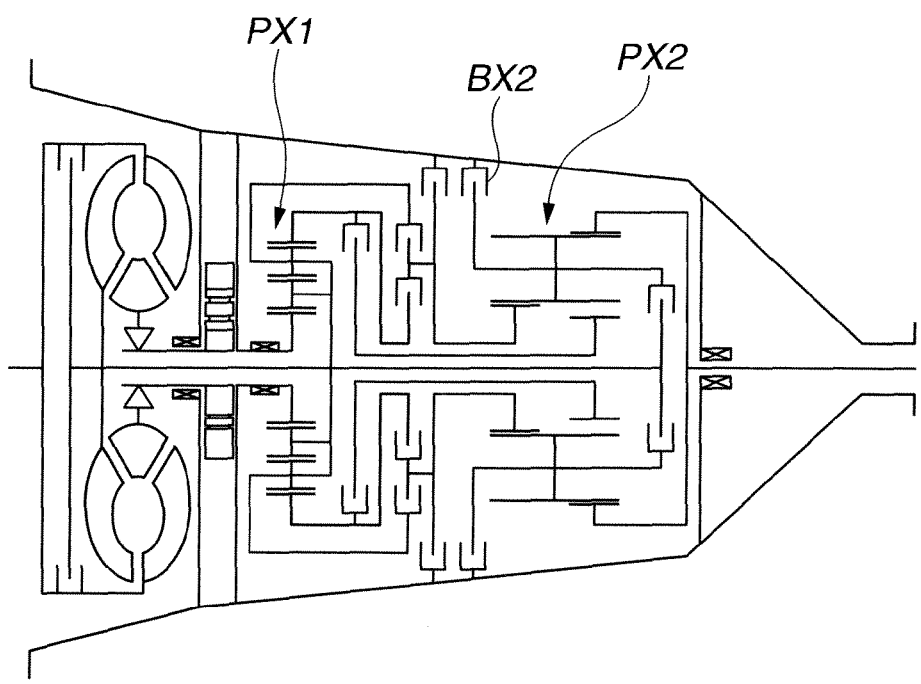
FIG. 13 is a skeleton diagram showing an automatic transmission according to a reference example.

The following describes advantageous effects produced by the automatic transmission according to the first embodiment as compared to a reference example. FIG. 13 shows an automatic transmission according to a reference example as disclosed in Japanese Patent Application Publication No. 2001-182785. FIG. 14 shows which two of six coupling members are selectively applied to obtain respective ones of eight forward gear ratios and two reverse gear ratios in the automatic transmission shown in FIG. 13. FIG. 15 shows the number of gear meshes in torque flow in each forward gear ratio in the automatic transmission shown in FIG. 13.

The automatic transmission according to the reference example can be regarded as having three planetary gearsets, as described below. The automatic transmission according to the first embodiment and the automatic transmission according to the reference example have the following three common features: (1) The transmission includes three planetary gearsets and six coupling members for providing eight forward gear ratios and one reverse gear ratio; (2) Every gearshift between two adjacent gears is implemented by a single clutch changeover operation, namely, by a single combination of application of one coupling member and release of another coupling member; and (3) The ratio of the reverse gear ratio to the first gear ratio is higher than 0.7, so that an adequate driving torque is provided in reverse gear. However, the automatic transmission according to the first embodiment is advantageous at least in the following points as compared to the automatic transmission according to the reference example.

<A. Three Planetary Gearsets> The automatic transmission according to the reference example includes a double-pinion planetary gearset PX1, and a Ravigneaux planetary gearset PX2. The Ravigneaux planetary gearset has two sun gears; two sets, one longer than the other, of planet pinions supported in one planet-pinion carrier; and a single ring gear. The Ravigneaux planetary gearset can be regarded as having a double-pinion planetary gearset and a single-pinion planetary gearset. In summary, the automatic transmission according to the reference example is regarded as having two double-pinion planetary gearsets and one single-pinion planetary gearset. This structure can cause at least the following three adverse effects: (1) The number of gear meshes in torque flow is large, adversely affecting the gear efficiency and gear noise level; (2) The diameters of planet pinions are small, adversely affecting the durability and reliability of the planet pinions; and (3) The automatic transmission is composed of a large number of parts, adversely affecting the manufacturing cost.

In contrast, the automatic transmission according to the first embodiment has first planetary gearset PG1, second planetary gearset PG2, and third planetary gearset PG3, which are single-pinion planetary gearsets. This feature is advantageous at least in the following three points.

(i) The number of gear meshes in torque flow is smaller, so that the gear efficiency is higher, and gear noise level is lower, as compared to cases where an automatic transmission is constituted by a double-pinion planetary gearset. A double-pinion planetary gearset has three places in torque flow where torque is transmitted between gears turning in mesh with each other, whereas a single-pinion planetary gearset has two places in torque flow where torque is transmitted between gears turning in mesh with each other, with no pair of planet pinion gears turning in mesh with each other. In the automatic transmission according to the first embodiment, the average number of gear meshes in torque flow is equal to 4.0, as shown in FIG. 3. In contrast, in the automatic transmission according to the reference example, the average number of gear meshes in torque flow is equal to 4.8, because of presence of two double-pinion planetary gearsets. In this way, the automatic transmission according to the first embodiment achieves a reduction of 0.8 in the average number of gear meshes in torque flow.

(ii) The diameter of planet pinion gears is larger, so that the durability and reliability of the planet pinion gears is higher. In a single-pinion planetary gearset, a set of planet pinion gears are arranged between a sun gear and a ring gear, where the diameter of each planet pinion gear is set equal to about the spacing between the sun gear and the ring gear. In contrast, in a double-pinion planetary gearset, the diameter of each planet pinion gear must be set smaller than the spacing between the sun gear and the ring gear. In this way, in a single-pinion planetary gearset, the diameter of each planet pinion gear is larger, so that the rigidity of the planet pinion gear and the strength of the tooth flanks of the planet pinion gear can be enhanced, and the durability and reliability can be therefore enhanced.

(iii) The smaller number of parts leads to a reduced manufacturing cost. For example, if four planet pinion sets are needed, a double-pinion planetary gearset has four sets of double pinion gears, namely, eight planet pinion gears. In contrast, a single-pinion planetary gearset has four sets of single pinion gears, namely, four planet pinion gears. In this way, the automatic transmission according to the first embodiment achieves a reduction of four in the number of planet pinion gears, for example, and thereby a reduction in the manufacturing cost.

<B. The Number of Coupling Members Simultaneously Applied in Each Gear> In the automatic transmission according to the reference example, each gear ratio is obtained by simultaneous application of two of the six coupling members, as shown in FIG. 14. Accordingly, in this automatic transmission, four of the coupling members are released constantly, in each of which a pair of engaging elements are rotating relative to each other. For example, in first gear, second clutch CX2, third clutch CX3, fourth clutch CX4, and first brake BX1 are released, in each of which a pair of engaging elements are rotating with respect to each other. Relative rotation between the engaging elements in each released coupling member can cause a friction loss due to drag, and thereby adversely affect the power transfer efficiency. If the automatic transmission according to the reference example is applied to an engine vehicle, the friction loss in the four coupling members can cause a decrease in the fuel efficiency of the vehicle. In contrast, in the automatic transmission according to the first embodiment, obtain each gear ratio is obtained by simultaneous application of three of the six coupling members. Accordingly, in the automatic transmission according to the first embodiment, three of the coupling members are released constantly, in each of which a pair of engaging elements are rotating relative to each other. For example, in first gear, second clutch C2, third clutch C3 and second brake B2 are released, in each of which a pair of engaging elements are rotating with respect to each other. In this way, the automatic transmission according to the first embodiment achieves a reduction in the number of coupling members released, and thereby a reduction in the friction loss, and an increase in the power transfer efficiency. If applied to an engine vehicle, the automatic transmission according to the first embodiment enhances the fuel efficiency of the vehicle.

<C. The Frequency of Shifting> The automatic transmission according to the reference example provides a direct drive gear ratio in sixth gear, while providing underdrive gear ratios in first to fifth gears, as shown in FIG. 14. This can cause a reduction in the intervals between the underdrive gear ratios, which can cause busy shifting, i.e. increase the frequency of shifting, for example, under city driving conditions where frequent stops and restarts are needed. Such busy shifting can make a driver feel uncomfortable, because engine rotation rises quickly in underdrive gears, in general. In contrast, the automatic transmission according to the first embodiment provides a direct drive gear ratio in fifth gear, while providing underdrive gear ratios in first to fourth gears. This expands the intervals between the underdrive gear ratios, and suppresses busy shifting, for example, under city driving conditions where frequent stops and restarts are needed, and thereby prevents a driver from feeling uncomfortable.

<D. Gear Ratio Range> The gear ratio range of an automatic transmission is represented by an indicator called overall gear ratio coverage which is a ratio of the highest gear ratio (the gear ratio in the lowest gear) to the lowest gear ratio (the gear ratio in the highest gear). The overall gear ratio coverage RC is desired to be high in general. The automatic transmission according to the reference example provides an overall gear ratio coverage RC of 6.397 (=4.267/0.667), as shown in FIG. 14. In contrast, the automatic transmission according to the first embodiment provides an overall gear ratio coverage RC of 7.408 (=4.408/0.595), while maintaining preferable intervals between two adjacent gear ratios, where the sun-to-ring gear ratio of first planetary gearset PG1, p1, is equal to 0.300, the sun-to-ring gear ratio of second planetary gearset PG2, p2, is equal to 0.333, and the sun-to-ring gear ratio of third planetary gearset PG3, p3, is equal to 0.524. This enhances both of the starting performance in the lowest gear and the fuel efficiency at high speed in the highest gear. Incidentally, it is preferable that when the ratios between two adjacent gear ratios are plotted and connected by lines in a graph, the graph shows a gradual and smooth decrease, and then a flat extension, when followed from the low gear side to the high gear side. The output speed of the automatic transmission is adjusted with a final gear ratio by the final gear which is disposed on the downstream side of the automatic transmission, and then outputted to the driving wheels. Therefore, as the overall gear ratio coverage RC increases, the flexibility of adjustment by the final gear increases. For example, with the final gear ratio adjusted to be high (or low-geared), the automatic transmission can be suitably adapted to a hybrid vehicle with no torque converter. The automatic transmission can be also suitably adapted to gasoline engines and diesel engines in which the range for providing the optimum fuel efficiency is different from the range for providing the maximum torque.

<E. Shape of Automatic Transmission> In many automatic transmissions, a brake is arranged between a rotating member and a transmission case. If the brake is subject to a large torque, the number of plates of the brake is increased, and the diameter of the transmission case is increased. In the automatic transmission according to the reference example, second brake BX2 is subject to the largest torque among the coupling members. As shown in FIG. 13, second brake BX2 is arranged between the double-pinion planetary gearset PX1 and the Ravigneaux planetary gearset PX2. Accordingly, in order to avoid interference with the transmission case, a vehicle floor panel must be formed with a large floor tunnel which projects inside a passenger room. In contrast, in the automatic transmission according to the first embodiment, second brake B2 is arranged closer to the input side than first planetary gearset PG1, where second brake B2 is subject to the largest torque among the coupling members. This makes it possible to avoid interference with the vehicle floor pan, without an increase in the diameter of a portion of transmission case TC which portion overlaps with the vehicle floor panel. Namely, for arrangement of second brake B2, it is sufficient that only a portion of transmission case TC in a power unit room (engine room) is expanded in diameter. This allows the remaining portion of transmission case TC to have a smaller diameter. Accordingly, it is sufficient to form a smaller floor tunnel in the vehicle floor panel in order to avoid interference with transmission case TC. The feature that the sun-to-ring gear ratios of first planetary gearset PG1, second planetary gearset PG2, and third planetary gearset PG3, p1, p2 and p3, are within a range of 0.3 to 0.65, is effective for reducing the sizes of first planetary gearset PG1, second planetary gearset PG2, and third planetary gearset PG3, and thereby reducing the size of transmission case TC.

The following summarizes the features of the automatic transmission according to the first embodiment, and the advantageous effects produced by the features.

<A1> An automatic transmission comprises: a first planetary gearset (PG1) including: a first sun gear (S1); a first ring gear (R1); and a first planet-pinion carrier (PC1) arranged to carry a first planet pinion (P1) in mesh with the first sun gear (S1) and the first ring gear (R1); a second planetary gearset (PG2) including: a second sun gear (S2); a second ring gear (R2), wherein the second ring gear (R2) is constantly coupled to the first planet-pinion carrier (PC1) so as to constitute a first rotor unit (first rotor M1, second ring gear R2, first planet-pinion carrier PC1); and a second planet-pinion carrier (PC2) arranged to carry a second planet pinion (P2) in mesh with the second sun gear (S2) and the second ring gear (R2); a third planetary gearset (PG3) including: a third sun gear (S3), wherein the third sun gear (S3) is constantly coupled to the first ring gear (R1) so as to constitute a second rotor unit (second rotor M2, third sun gear S3, first ring gear R1); a third ring gear (R3); and a third planet-pinion carrier (PC3) arranged to carry a third planet pinion (P3) in mesh with the third sun gear (S3) and the third ring gear (R3); an input shaft (IN) constantly coupled to the second sun gear (S2); an output shaft (OUT) constantly coupled to the third ring gear (R3); a first coupling member (first clutch C1) arranged to be selectively applied to couple the first sun gear (S1) to the third planet-pinion carrier (PC3); a second coupling member (first brake B1) arranged to be selectively applied to hold the first sun gear (S1) stationary; a third coupling member (second clutch C2) arranged to be selectively applied to couple the second sun gear (S2) to the third planet-pinion carrier (PC3); a fourth coupling member (third clutch C3) arranged to be selectively applied to couple the second planet-pinion carrier (PC2) to the second rotor unit (M2, S3, R1); a fifth coupling member (fourth clutch C4) arranged to be selectively applied to couple the second planet-pinion carrier (PC2) to the third planet-pinion carrier (PC3); and a sixth coupling member (second brake B2) arranged to be selectively applied to hold the first rotor unit (M1, R2, PC1) stationary, wherein at least first to eighth gear ratios and one reverse gear ratio are obtained between the input shaft (IN) and the output shaft (OUT) by simultaneous application of three of the first to sixth coupling members (C1, B1, C2, C3, C4, B2). This feature is advantageous in the gear efficiency, gear noise level, durability and reliability, and manufacturing cost, and effective for enhancing the power transfer efficiency while suppressing the friction loss.

<A2> In the automatic transmission: the first gear ratio is obtained by simultaneous application of the first, second and fifth coupling members (first clutch C1, first brake B1, fourth clutch C4); the second gear ratio is obtained by simultaneous application of the second, fifth and sixth coupling members (first brake B1, fourth clutch C4, second brake B2); the third gear ratio is obtained by simultaneous application of the second, fourth and fifth coupling members (first brake B1, third clutch C3, fourth clutch C4); the fourth gear ratio is obtained by simultaneous application of the second, third and fifth coupling members (first brake B1, second clutch C2, fourth clutch C4); the fifth gear ratio is obtained by simultaneous application of the third, fourth and fifth coupling members (second clutch C2, third clutch C3, fourth clutch C4); the sixth gear ratio is obtained by simultaneous application of the second, third and fourth coupling members (first brake B1, second clutch C2, third clutch C3); the seventh gear ratio is obtained by simultaneous application of the third, fourth and sixth coupling members (second clutch C2, third clutch C3, second brake B2); and the eighth gear ratio is obtained by simultaneous application of the first, third and sixth coupling members (first clutch C1, second clutch C2, second brake B2). This feature is advantageous because each shifting operation between two adjacent gears is simply implemented by a single combination of application of one coupling member and release of another coupling member. The feature that direct drive is carried out in fifth gear is effective for providing suitable intervals between two adjacent underdrive gears, and thereby preventing busy shifting. This also provides a larger overall gear ratio coverage RC, while maintaining preferable intervals between two adjacent gear ratios, and thereby enhances both of the starting performance in the lowest gear and the fuel efficiency at high speed in the highest gear.

<A3> In the automatic transmission, the reverse gear ratio is obtained by simultaneous application of the first, second and fourth coupling members (first clutch C1, first brake B1, third clutch C3). This feature makes it possible to set the ratio of the reverse gear ratio to the first gear ratio close to one so that an adequate driving torque is provided in reverse gear, while maintaining a preferable overall gear ratio coverage RC and preferable intervals between two adjacent gear ratios.

<A4> In the automatic transmission: the first planetary gearset (PG1), the second planetary gearset (PG2), and the third planetary gearset (PG3) are arranged in this order from an input side to an output side in an axial direction of the automatic transmission, wherein the input shaft (IN) is arranged at the input side, and the output shaft (OUT) is arranged at the output side; and the second and sixth coupling members (first brake B1, second brake B2) are arranged closer to the input side in the axial direction than the first planetary gearset (PG1). This feature allows the middle and rear portions of transmission case TC to have a smaller diameter. Accordingly, it is sufficient to form a smaller floor tunnel in the vehicle floor panel in order to avoid interference with transmission case TC.

Second Embodiment

The automatic transmission according to the second embodiment provides an eighth gear ratio which is obtained by simultaneous application of a different combination of three of the coupling members than in the first embodiment.

FIG. 16 shows which three of six coupling members are selectively applied to obtain respective ones of first to eighth gear ratios and one reverse gear ratio in the automatic transmission according to the second embodiment. FIG. 17 shows the number of gear meshes in torque flow in each forward gear ratio in the automatic transmission according to the second embodiment.

The eighth gear ratio is obtained by simultaneous application of first brake B1, second clutch C2 and second brake B2, as shown in FIG. 16. As shown in FIG. 17, in eighth gear, the number of gear meshes in torque flow is two, because only third planetary gearset PG3 works for power transfer, and has two places in torque flow where torque is transmitted between gears turning in mesh with each other. The first to seventh gear ratios are obtained in the same manners as in the first embodiment.

Figure 18:
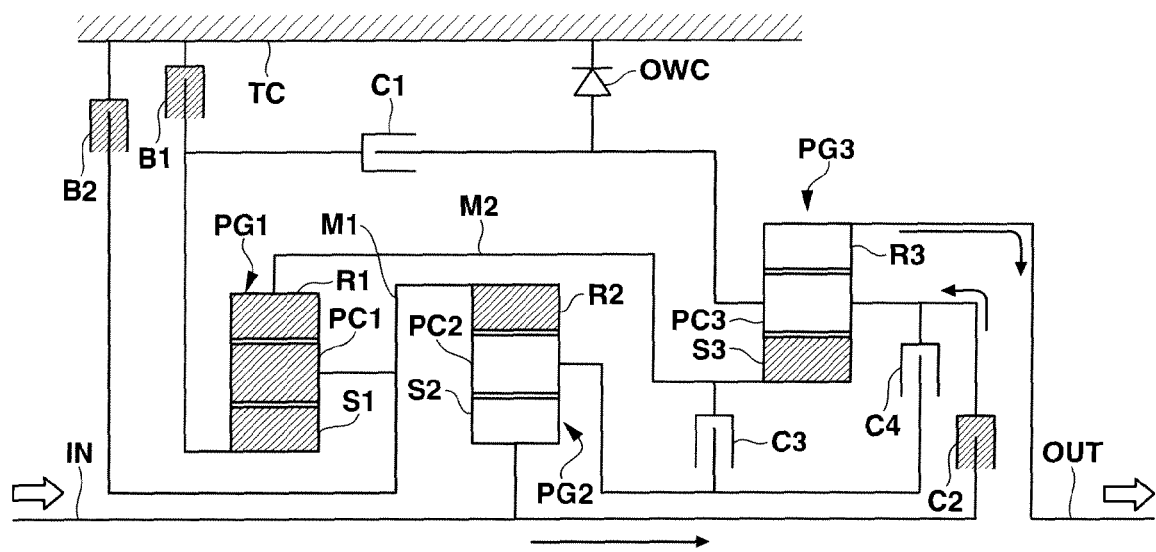
FIG. 18 is a diagram showing how the eighth gear ratio is obtained in the automatic transmission according to the second embodiment.

FIG. 18 shows how the eighth gear ratio is obtained in the automatic transmission according to the second embodiment.

<Eighth Gear> In eighth gear, first brake B1, second clutch C2 and second brake B2 are simultaneously applied, as shown by hatching pattern in FIG. 18. With first brake B1 and second brake B2 simultaneously applied, first sun gear S1, first planet-pinion carrier PC1 and first ring gear R1 are locked together, and held stationary with respect to transmission case TC. Accordingly, second ring gear R2, and third sun gear S3, which are constantly coupled to first planet-pinion carrier PC1 and first ring gear R1 respectively through first rotor M1 and second rotor M2 respectively, are held stationary with respect to transmission case TC. With second clutch C2 applied, third planet-pinion carrier PC3 is coupled to input shaft IN. When third planet-pinion carrier PC3 is driven in the normal direction with input shaft IN, the rotation of third planet-pinion carrier PC3 causes third ring gear R3 to rotate in the normal direction at an increased speed in third planetary gearset PG3 where third sun gear S3 is held stationary. Finally, the rotation of third ring gear R3 drives output shaft OUT in the normal direction with a speed increase of the eighth gear ratio with respect to the rotational speed of input shaft IN, where the rotation of output shaft OUT is faster than in seventh gear.

In the automatic transmission according to the second embodiment, every gearshift between two adjacent gears is implemented by a single clutch changeover operation, namely, by a single combination of application of one coupling member and release of another coupling member. This is advantageous, because gearshifts, which include gearshifts from one gear to another gear by two steps, can be implemented by a simple shift control. The overall gear ratio coverage RC is smaller than in the first embodiment, but the number of gear meshes in torque flow is 3.75, which is smaller than in the first embodiment. In other aspects, the automatic transmission according to the second embodiment produces the same advantageous effects as in the first embodiment.

The automatic transmission according to the second embodiment produces the following advantageous effect, in addition to items <A1>, <A3> and <A4> which are common to the first embodiment, and described above.

<A5> In the automatic transmission: the first gear ratio is obtained by simultaneous application of the first, second and fifth coupling members (first clutch C1, first brake B1, fourth clutch C4); the second gear ratio is obtained by simultaneous application of the second, fifth and sixth coupling members (first brake B1, fourth clutch C4, second brake B2); the third gear ratio is obtained by simultaneous application of the second, fourth and fifth coupling members (first brake B1, third clutch C3, fourth clutch C4); the fourth gear ratio is obtained by simultaneous application of the second, third and fifth coupling members (first brake B1, second clutch C2, fourth clutch C4); the fifth gear ratio is obtained by simultaneous application of the third, fourth and fifth coupling members (second clutch C2, third clutch C3, fourth clutch C4); the sixth gear ratio is obtained by simultaneous application of the second, third and fourth coupling members (first brake B1, second clutch C2, third clutch C3); the seventh gear ratio is obtained by simultaneous application of the third, fourth and sixth coupling members (second clutch C2, third clutch C3, second brake B2); and the eighth gear ratio is obtained by simultaneous application of the second, third and sixth coupling members (first brake B1, second clutch C2, second brake B2). This feature is advantageous, because each shifting operation between two adjacent gears is simply implemented by a single combination of application of one coupling member and release of another coupling member, and thereby gearshifts, which include gearshifts from one gear to another gear by two steps, can be implemented by a simple shift control. The feature that direct drive is carried out in fifth gear is effective for providing suitable intervals between two adjacent underdrive gears, and thereby preventing busy shifting. Moreover, the average number of gear meshes in torque flow is smaller, so that the gear efficiency and the gear noise level are further improved, as compared to the first embodiment.

Third Embodiment

The automatic transmission according to the third embodiment employs as first to sixth and eight gear ratios the second to seventh and eighth gear ratios presented by the first embodiment, and as a seventh gear ratio the eighth gear ratio presented by the second embodiment.

FIG. 19 shows which three of six coupling members are selectively applied to obtain respective ones of first to eighth gear ratios and one reverse gear ratio in the automatic transmission according to the third embodiment. FIG. 20 shows the number of gear meshes in torque flow in each forward gear ratio in the automatic transmission according to the third embodiment.

The first gear ratio is obtained in the same manner as the second gear ratio presented by the first embodiment, as shown in FIG. 19. As shown in FIG. 20, in first gear, the number of gear meshes in torque flow is four as in second gear in the first embodiment.

The second gear ratio is obtained in the same manner as the third gear ratio presented by the first embodiment, as shown in FIG. 19. As shown in FIG. 20, in second gear, the number of gear meshes in torque flow is four as in third gear in the first embodiment.

The third gear ratio is obtained in the same manner as the fourth gear ratio presented by the first embodiment, as shown in FIG. 19. As shown in FIG. 20, in third gear, the number of gear meshes in torque flow is four as in fourth gear in the first embodiment.

The fourth gear ratio is obtained in the same manner as the fifth gear ratio presented by the first embodiment, as shown in FIG. 19. As shown in FIG. 20, in fourth gear, the number of gear meshes in torque flow is zero as in fifth gear in the first embodiment.

The fifth gear ratio is obtained in the same manner as the sixth gear ratio presented by the first embodiment, as shown in FIG. 19. As shown in FIG. 20, in fifth gear, the number of gear meshes in torque flow is six as in sixth gear in the first embodiment.

The sixth gear ratio is obtained in the same manner as the seventh gear ratio presented by the first embodiment, as shown in FIG. 19. As shown in FIG. 20, in sixth gear, the number of gear meshes in torque flow is four as in seventh gear in the first embodiment.

The seventh gear ratio is obtained in the same manner as the eighth gear ratio presented by the second embodiment, as shown in FIG. 19. As shown in FIG. 20, in seventh gear, the number of gear meshes in torque flow is two as in eighth gear in the second embodiment.

The eighth gear ratio is obtained in the same manner as the eighth gear ratio presented by the first embodiment, as shown in FIG. 19. As shown in FIG. 20, in eighth gear, the number of gear meshes in torque flow is four as in eighth gear in the first embodiment.

The reverse gear ratio is obtained in the same manner as the reverse gear ratio presented by the first embodiment, as shown in FIG. 19.

In the automatic transmission according to the third embodiment, every gearshift between two adjacent gears is implemented by a single clutch changeover operation, namely, by a single combination of application of one coupling member and release of another coupling member. This is advantageous, because gearshifts, which include gearshifts from one gear to another gear by two steps, can be implemented by a simple shift control. The automatic transmission according to the third embodiment provides direct drive in fourth gear, which is further effective for increasing the intervals between the underdrive gear ratios, and thereby preventing busy shifting and the resulting adverse effect on driving feel, as compared to the first and second embodiments where direct drive is provided in fifth gear. Moreover, although the overall gear ratio coverage RC is smaller than in the first embodiment, the number of gear meshes in torque flow is 3.50, which is smaller than in the first and second embodiments. In other aspects, the automatic transmission according to the second embodiment produces the same advantageous effects as in the first embodiment.

The automatic transmission according to the third embodiment produces the following advantageous effect, in addition to items <A1>, <A3> and <A4> which are common to the first embodiment, and described above.

<A6> In the automatic transmission: the first gear ratio is obtained by simultaneous application of the second, fifth and sixth coupling members (first brake B1, fourth clutch C4, second brake B2); the second gear ratio is obtained by simultaneous application of the second, fourth and fifth coupling members (first brake B1, third clutch C3, fourth clutch C4); the third gear ratio is obtained by simultaneous application of the second, third and fifth coupling members (first brake B1, second clutch C2, fourth clutch C4); the fourth gear ratio is obtained by simultaneous application of the third, fourth and fifth coupling members (second clutch C2, third clutch C3, fourth clutch C4); the fifth gear ratio is obtained by simultaneous application of the second, third and fourth coupling members (first brake B1, second clutch C2, third clutch C3); the sixth gear ratio is obtained by simultaneous application of the third, fourth and sixth coupling members (second clutch C2, third clutch C3, second brake B2); the seventh gear ratio is obtained by simultaneous application of the second, third and sixth coupling members (first brake B1, second clutch C2, second brake B2); and the eighth gear ratio is obtained by simultaneous application of the first, third and sixth coupling members (first dutch C1, second clutch C2, second brake B2). This feature is advantageous, because each shifting operation between two adjacent gears is simply implemented by a single combination of application of one coupling member and release of another coupling member, and thereby gearshifts, which include gearshifts from one gear to another gear by two steps, can be implemented by a simple shift control. The feature that direct drive is carried out in fourth gear is effective for providing suitable intervals between two adjacent underdrive gears, and thereby further preventing busy shifting, as compared to the first and second embodiments. Moreover, the average number of gear meshes in torque flow is smaller, so that the gear efficiency and the gear noise level are further improved, as compared to the first and second embodiments.

Fourth Embodiment

The automatic transmission according to the fourth embodiment employs as first to sixth and eight gear ratios the first to sixth and eighth gear ratios presented by the first embodiment, and as a seventh gear ratio the eighth gear ratio presented by the second embodiment.

FIG. 21 shows which three of six coupling members are selectively applied to obtain respective ones of first to eighth gear ratios and one reverse gear ratio in the automatic transmission according to the fourth embodiment. FIG. 22 shows the number of gear meshes in torque flow in each forward gear ratio in the automatic transmission according to the fourth embodiment.

The first gear ratio is obtained in the same manner as the first gear ratio presented by the first embodiment, as shown in FIG. 21. As shown in FIG. 22, in first gear, the number of gear meshes in torque flow is six as in first gear in the first embodiment.

The second gear ratio is obtained in the same manner as the second gear ratio presented by the first embodiment, as shown in FIG. 21. As shown in FIG. 22, in second gear, the number of gear meshes in torque flow is four as in second gear in the first embodiment.

The third gear ratio is obtained in the same manner as the third gear ratio presented by the first embodiment, as shown in FIG. 21. As shown in FIG. 22, in third gear, the number of gear meshes in torque flow is four as in third gear in the first embodiment.

The fourth gear ratio is obtained in the same manner as the fourth gear ratio presented by the first embodiment, as shown in FIG. 21. As shown in FIG. 22, in fourth gear, the number of gear meshes in torque flow is four as in fourth gear in the first embodiment.

The fifth gear ratio is obtained in the same manner as the fifth gear ratio presented by the first embodiment, as shown in FIG. 21. As shown in FIG. 22, in fifth gear, the number of gear meshes in torque flow is zero as in fifth gear in the first embodiment.

The sixth gear ratio is obtained in the same manner as the sixth gear ratio presented by the first embodiment, as shown in FIG. 21. As shown in FIG. 22, in sixth gear, the number of gear meshes in torque flow is six as in sixth gear in the first embodiment.

The seventh gear ratio is obtained in the same manner as the eighth gear ratio presented by the second embodiment, as shown in FIG. 21. As shown in FIG. 22, in seventh gear, the number of gear meshes in torque flow is two as in eighth gear in the second embodiment.

The eighth gear ratio is obtained in the same manner as the eighth gear ratio presented by the first embodiment, as shown in FIG. 21. As shown in FIG. 22, in eighth gear, the number of gear meshes in torque flow is four as in eighth gear in the first embodiment.

The reverse gear ratio is obtained in the same manner as the reverse gear ratio presented by the first embodiment, as shown in FIG. 21.

In the automatic transmission according to the fourth embodiment, every gearshift between two adjacent gears is implemented by a single clutch changeover operation, namely, by a single combination of application of one coupling member and release of another coupling member. This is advantageous, because gearshifts, which include gearshifts from one gear to another gear by two steps, can be implemented by a simple shift control. The automatic transmission according to the fourth embodiment provides direct drive in fifth gear, which is effective for increasing the intervals between the underdrive gear ratios, and thereby preventing busy shifting and the resulting adverse effect on driving feel. The overall gear ratio coverage RC is the same as in the first embodiment, and the number of gear meshes in torque flow is 3.75, which is smaller than in the first embodiment. In other aspects, the automatic transmission according to the second embodiment produces the same advantageous effects as in the first embodiment.

The automatic transmission according to the fourth embodiment produces the following advantageous effect, in addition to items <A1>, <A3> and <A4> which are common to the first embodiment, and described above.

<A7> In the automatic transmission: the first gear ratio is obtained by simultaneous application of the first, second and fifth coupling members (first clutch C1, first brake B1, fourth clutch C4); the second gear ratio is obtained by simultaneous application of the second, fifth and sixth coupling members (first brake B1, fourth clutch C4, second brake B2); the third gear ratio is obtained by simultaneous application of the second, fourth and fifth coupling members (first brake B1, third clutch C3, fourth clutch C4); the fourth gear ratio is obtained by simultaneous application of the second, third and fifth coupling members (first brake B1, second clutch C2, fourth clutch C4); the fifth gear ratio is obtained by simultaneous application of the third, fourth and fifth coupling members (second clutch C2, third clutch C3, fourth clutch C4); the sixth gear ratio is obtained by simultaneous application of the second, third and fourth coupling members (first brake B1, second clutch C2, third clutch C3); the seventh gear ratio is obtained by simultaneous application of the second, third and sixth coupling members (first brake B1, second clutch C2, second brake B2); and the eighth gear ratio is obtained by simultaneous application of the first, third and sixth coupling members (first clutch C1, second clutch C2, second brake B2). This feature is advantageous because each shifting operation between two adjacent gears is simply implemented by a single combination of application of one coupling member and release of another coupling member. The feature that direct drive is carried out in fifth gear is effective for providing suitable intervals between two adjacent underdrive gears, and thereby preventing busy shifting. This also provides a larger overall gear ratio coverage RC, while maintaining preferable intervals between two adjacent gear ratios, and thereby enhances both of the starting performance in the lowest gear and the fuel efficiency at high speed in the highest gear. Moreover, the average number of gear meshes in torque flow is smaller, so that the gear efficiency and the gear noise level are further improved, as compared to the first embodiment.

Fifth Embodiment

The automatic transmission according to the fifth embodiment employs as first to seventh and ninth gear ratios the first to eighth gear ratios presented by the first embodiment, and as an eighth gear ratio the eighth gear ratio presented by the second embodiment.

FIG. 23 shows which three of six coupling members are selectively applied to obtain respective ones of first to ninth gear ratios and one reverse gear ratio in the automatic transmission according to the fifth embodiment. FIG. 24 shows the number of gear meshes in torque flow in each forward gear ratio in the automatic transmission according to the fifth embodiment.

The first gear ratio is obtained in the same manner as the first gear ratio presented by the first embodiment, as shown in FIG. 23. As shown in FIG. 24, in first gear, the number of gear meshes in torque flow is six as in first gear in the first embodiment.

The second gear ratio is obtained in the same manner as the second gear ratio presented by the first embodiment, as shown in FIG. 23. As shown in FIG. 24, in second gear, the number of gear meshes in torque flow is four as in second gear in the first embodiment.

The third gear ratio is obtained in the same manner as the third gear ratio presented by the first is embodiment, as shown in FIG. 23. As shown in FIG. 24, in third gear, the number of gear meshes in torque flow is four as in third gear in the first embodiment.

The fourth gear ratio is obtained in the same manner as the fourth gear ratio presented by the first embodiment, as shown in FIG. 23. As shown in FIG. 24, in fourth gear, the number of gear meshes in torque flow is four as in fourth gear in the first embodiment.

The fifth gear ratio is obtained in the same manner as the fifth gear ratio presented by the first embodiment, as shown in FIG. 23. As shown in FIG. 24, in fifth gear, the number of gear meshes in torque flow is zero as in fifth gear in the first embodiment.

The sixth gear ratio is obtained in the same manner as the sixth gear ratio presented by the first embodiment, as shown in FIG. 23. As shown in FIG. 24, in sixth gear, the number of gear meshes in torque flow is six as in sixth gear in the first embodiment.

The seventh gear ratio is obtained in the same manner as the seventh gear ratio presented by the first embodiment, as shown in FIG. 23. As shown in FIG. 24, in seventh gear, the number of gear meshes in torque flow is four as in seventh gear in the first embodiment.

The eighth gear ratio is obtained in the same manner as the eighth gear ratio presented by the second embodiment, as shown in FIG. 23. As shown in FIG. 24, in eighth gear, the number of gear meshes in torque flow is two as in eighth gear in the second embodiment.

The ninth gear ratio is obtained in the same manner as the eighth gear ratio presented by the first embodiment, as shown in FIG. 23. As shown in FIG. 24, in ninth gear, the number of gear meshes in torque flow is four as in eighth gear in the first embodiment.

The reverse gear ratio is obtained in the same manner as the reverse gear ratio presented by the first embodiment, as shown in FIG. 23.

The automatic transmission according to the fifth embodiment provides nine forward gear ratios, in contrast to the first to fourth embodiments where eight forward gear ratios are provided. Although the overall gear ratio coverage RC is the same in the first embodiment, the overall gear ratio coverage RC can be more easily increased by adjustment of the intervals between the gear ratios. In the automatic transmission according to the fifth embodiment, every gearshift between two adjacent gears is implemented by a single clutch changeover operation, namely, by a single combination of application of one coupling member and release of another coupling member. This is advantageous, because gearshifts, which include gearshifts from one gear to another gear by two steps, can be implemented by a simple shift control. The number of gear meshes in torque flow is 3.80, which is smaller so that the gear efficiency and the gear noise level is further improved, as compared to the first embodiment. In other aspects, the automatic transmission according to the second embodiment produces the same advantageous effects as in the first embodiment.

The automatic transmission according to the fifth embodiment produces the following advantageous effect, in addition to items <A1>, <A3> and <A4> which are common to the first embodiment, and described above.

<A8> In the automatic transmission: the first gear ratio is obtained by simultaneous application of the first, second and fifth coupling members (first clutch C1, first brake B1, fourth clutch C4); the second gear ratio is obtained by simultaneous application of the second, fifth and sixth coupling members (first brake B1, fourth clutch C4, second brake B2); the third gear ratio is obtained by simultaneous application of the second, fourth and fifth coupling members (first brake B1, third clutch C3, fourth clutch C4); the fourth gear ratio is obtained by simultaneous application of the second, third and fifth coupling members (first brake B1, second dutch C2, fourth clutch C4); the fifth gear ratio is obtained by simultaneous application of the third, fourth and fifth coupling members (second clutch C2, third clutch C3, fourth clutch C4); the sixth gear ratio is obtained by simultaneous application of the second, third and fourth coupling members (first brake B1, second clutch C2, third clutch C3); the seventh gear ratio is obtained by simultaneous application of the third, fourth and sixth coupling members (second clutch C2, third clutch C3, second brake B2); the eighth gear ratio is obtained by simultaneous application of the second, third and sixth coupling members (first brake 51, second clutch C2, second brake B2); and a ninth gear ratio is obtained between the input shaft (IN) and the output shaft (OUT) by simultaneous application of the first, third and sixth coupling members (first clutch C1, second clutch C2, second brake B2). This feature provides nine gear ratios in response to demand for increase in the number of gear ratios, and is advantageous, because each shifting operation between two adjacent gears is simply implemented by a single combination of application of one coupling member and release of another coupling member, and thereby gearshifts, which include gearshifts from one gear to another gear by two steps, can be implemented by a simple shift control. The feature that direct drive is carried out in fifth gear is effective for providing suitable intervals between two adjacent underdrive gears, and thereby preventing busy shifting. This also provides a larger overall gear ratio coverage RC, while maintaining preferable intervals between two adjacent gear ratios, and thereby enhances both of the starting performance in the lowest gear and the fuel efficiency at high speed in the highest gear. Moreover, the average number of gear meshes in torque flow is smaller, so that the gear efficiency and the gear noise level are further improved, as compared to the first embodiment.

<Modifications> The set of combinations of three of the coupling members simultaneously applied to obtain at least eight forward gear ratios and one reverse gear ratio is not limited to the first to fifth embodiments, and may be modified differently.

The present automatic transmissions may be adapted to forward engine forward drive vehicles, hybrid vehicles, electric vehicles, fuel cell vehicles, etc., as well as front engine rear drive vehicles to which the present automatic transmissions are adapted.

The entire contents of Japanese Patent Application 2009-075585 filed Mar. 26, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
a first planetary gearset including:
   a first sun gear;
   a first ring gear; and
   a first planet-pinion carrier arranged to carry a first planet pinion in mesh with the first sun gear and the first ring gear;
a second planetary gearset including:
   a second sun gear;
   a second ring gear, wherein the second ring gear is constantly coupled to the first planet-pinion carrier so as to constitute a first rotor unit; and
   a second planet-pinion carrier arranged to carry a second planet pinion in mesh with the second sun gear and the second ring gear;
a third planetary gearset including:
   a third sun gear, wherein the third sun gear is constantly coupled to the first ring gear so as to constitute a second rotor unit;
   a third ring gear; and
   a third planet-pinion carrier arranged to carry a third planet pinion in mesh with the third sun gear and the third ring gear;
an input shaft constantly coupled to the second sun gear;
an output shaft constantly coupled to the third ring gear;
a first coupling member arranged to be selectively applied to couple the first sun gear to the third planet-pinion carrier independently of operation of other coupling members;
a second coupling member arranged to be selectively applied to hold the first sun gear stationary independently of operation of other coupling members;
a third coupling member arranged to be selective applied to couple the second sun gear to the third planet-pinion carrier independently of operation of other coupling members;
a fourth coupling member arranged to be selectively applied to couple the second planet-pinion carrier to the second rotor unit independently of operation of other coupling members;
a fifth coupling member arranged to be selectively applied to couple the second planet-pinion carrier to the third planet-pinion carrier independently of operation of other coupling members; and
a sixth coupling member arranged to be selectively applied to hold the first rotor unit stationary independently of operation of other coupling members, wherein at least first to eighth gear ratios and one reverse gear ratio are obtained between the input shaft and the output shaft by simultaneous application of three of the first to sixth coupling members.

2. The automatic transmission as claimed in claim 1, wherein:
the first gear ratio is obtained by simultaneous application of the first, second and fifth coupling members;
the second gear ratio is obtained by simultaneous application of the second, fifth and sixth coupling members;
the third gear ratio is obtained by simultaneous application of the second, fourth and fifth coupling members;
the fourth gear ratio is obtained by simultaneous application of the second, third and fifth coupling members;
the fifth gear ratio is obtained by simultaneous application of the third, fourth and fifth coupling members;
the sixth gear ratio is obtained by simultaneous application of the second, third and fourth coupling members;
the seventh gear ratio is obtained by simultaneous application of the third, fourth and sixth coupling members; and
the eighth gear ratio is obtained by simultaneous application of the first, third and sixth coupling members.

3. The automatic transmission as claimed in claim 1, wherein:
the first gear ratio is obtained by simultaneous application of the first, second and fifth coupling members;
the second gear ratio is obtained by simultaneous application of the second, fifth and sixth coupling members;
the third gear ratio is obtained by simultaneous application of the second, fourth and fifth coupling members;
the fourth gear ratio is obtained by simultaneous application of the second, third and fifth coupling members;
the fifth gear ratio is obtained by simultaneous application of the third, fourth and fifth coupling members;
the sixth gear ratio is obtained by simultaneous application of the second, third and fourth coupling members;
the seventh gear ratio is obtained by simultaneous application of the third, fourth and sixth coupling members; and
the eighth gear ratio is obtained by simultaneous application of the second, third and sixth coupling members.

4. The automatic transmission as claimed in claim 1, wherein:
the first gear ratio is obtained by simultaneous application of the second, fifth and sixth coupling members;
the second gear ratio is obtained by simultaneous application of the second, fourth and fifth coupling members;
the third gear ratio is obtained by simultaneous application of the second, third and fifth coupling members;
the fourth gear ratio is obtained by simultaneous application of the third, fourth and fifth coupling members;
the fifth gear ratio is obtained by simultaneous application of the second, third and fourth coupling members;
the sixth gear ratio is obtained by simultaneous application of the third, fourth and sixth coupling members;
the seventh gear ratio is obtained by simultaneous application of the second, third and sixth coupling members; and
the eighth gear ratio is obtained by simultaneous application of the first, third and sixth coupling members.

5. The automatic transmission as claimed in claim 1, wherein:
the first gear ratio is obtained by simultaneous application of the first, second and fifth coupling members;
the second gear ratio is obtained by simultaneous application of the second, fifth and sixth coupling members;
the third gear ratio is obtained by simultaneous application of the second, fourth and fifth coupling members;
the fourth gear ratio is obtained by simultaneous application of the second, third and fifth coupling members;
the fifth gear ratio is obtained by simultaneous application of the third, fourth and fifth coupling members;
the sixth gear ratio is obtained by simultaneous application of the second, third and fourth coupling members;
the seventh gear ratio is obtained by simultaneous application of the second, third and sixth coupling members; and
the eighth gear ratio is obtained by simultaneous application of the first, third and sixth coupling members.

6. The automatic transmission as claimed in claim 1, wherein:
the first gear ratio is obtained by simultaneous application of the first, second and fifth coupling members;
the second gear ratio is obtained by simultaneous application of the second, fifth and sixth coupling members;
the third gear ratio is obtained by simultaneous application of the second, fourth and fifth coupling members;
the fourth gear ratio is obtained by simultaneous application of the second, third and fifth coupling members;
the fifth gear ratio is obtained by simultaneous application of the third, fourth and fifth coupling members;
the sixth gear ratio is obtained by simultaneous application of the second, third and fourth coupling members;
the seventh gear ratio is obtained by simultaneous application of the third, fourth and sixth coupling members;
the eighth gear ratio is obtained by simultaneous application of the second, third and sixth coupling members; and
a ninth gear ratio is obtained between the input shaft and the output shaft by simultaneous application of the first, third and sixth coupling members.

7. The automatic transmission as claimed in claim 1, wherein the reverse gear ratio is obtained by simultaneous application of the first, second and fourth coupling members.

8. The automatic transmission as claimed in claim 1, wherein:
the first planetary gearset, the second planetary gearset, and the third planetary gearset are arranged in this order from an input side to an output side in an axial direction of the automatic transmission, wherein the input shaft is arranged at the input side, and the output shaft is arranged at the output side; and
the second and sixth coupling members are arranged closer to the input side in the axial direction than the first planetary gearset.

* * * * *